US010922297B2

(12) United States Patent
Mittal et al.

(10) Patent No.: US 10,922,297 B2
(45) Date of Patent: Feb. 16, 2021

(54) GARBAGE COLLECTION FOR IN-MEMORY ROW STORAGE

(71) Applicant: SAP SE, Walldorf (DE)

(72) Inventors: Rahul Mittal, Pune (IN); Amit Pathak, Pune (IN); Jay Sudrik, Bangalore (IN); Simhachala Sasikanth Gottapu, Dublin, CA (US)

(73) Assignee: SAP SE, Walldorf (DE)

( * ) Notice: Subject to any disclaimer, the term of this patent is extended or adjusted under 35 U.S.C. 154(b) by 367 days.

(21) Appl. No.: 15/908,724

(22) Filed: Feb. 28, 2018

(65) Prior Publication Data

US 2018/0349270 A1 Dec. 6, 2018

Related U.S. Application Data

(60) Provisional application No. 62/521,513, filed on Jun. 18, 2017.

(51) Int. Cl.
*G06F 16/22* (2019.01)
*G06F 16/27* (2019.01)
(Continued)

(52) U.S. Cl.
CPC .......... *G06F 16/2255* (2019.01); *G06F 3/061* (2013.01); *G06F 3/0604* (2013.01);
(Continued)

(58) Field of Classification Search
CPC .. G06F 16/2379; G06F 16/27; G06F 16/2329; G06F 16/2322; G06F 16/2358;
(Continued)

(56) References Cited

U.S. PATENT DOCUMENTS 6,041,344 A  3/2000  Bodamer
9,052,942 B1  6/2015  Barber
(Continued)

FOREIGN PATENT DOCUMENTS

WO  WO-2016111702 A1  7/2016

OTHER PUBLICATIONS

Ailamaki, Anastassia, et al., "DBMSs on a modern processor: Where does time go?." *VLDB 99, Proceedings of 25th International Conference on Very Large Data Bases*, Sep. 7-10, 1999, Edinburgh, Scotland, UK. No. DIAS-CONF-1999-001. 1999 (12 pages).
(Continued)

*Primary Examiner* — Robert W Beausoliel, Jr.
*Assistant Examiner* — Pedro J Santos
(74) *Attorney, Agent, or Firm* — Mintz Levin Cohn Ferris Glovsky and Popeo, P.C.

(57) ABSTRACT

A system for an in-memory row storage architecture can be provided. In some implementations, the system performs operations including processing a database statement comprising a first database transaction affecting one or more rows in an in-memory row store, registering the database statement at a start of execution of the database statement, the start of execution occurring at a first time, unregistering the registered database statement at an end of execution of the database statement, determining a second time at which execution of an oldest currently registered database statement was started, assigning a garbage collection thread to a second database transaction committed at a third time and affecting at least one row of the plurality of rows, and activating the garbage collection thread to reclaim memory within the in-memory row store when the third time is less than the second time. Related systems, methods, and articles of manufacture are also described.

17 Claims, 16 Drawing Sheets

(51) Int. Cl.
  G06F 11/14    (2006.01)
  G06F 16/23    (2019.01)
  G06F 3/06     (2006.01)
  G06F 12/02    (2006.01)

(52) U.S. Cl.
  CPC ............ *G06F 3/065* (2013.01); *G06F 3/0644* (2013.01); *G06F 3/0653* (2013.01); *G06F 3/0673* (2013.01); *G06F 11/1471* (2013.01); *G06F 11/1474* (2013.01); *G06F 12/0253* (2013.01); *G06F 16/22* (2019.01); *G06F 16/2272* (2019.01); *G06F 16/2282* (2019.01); *G06F 16/2379* (2019.01); *G06F 16/27* (2019.01); *G06F 2201/80* (2013.01); *G06F 2201/82* (2013.01); *G06F 2212/1044* (2013.01)

(58) Field of Classification Search
  CPC ........... G06F 16/2372; G06F 16/24552; G06F 3/0604; G06F 3/0644; G06F 3/0653
  USPC ...... 707/E17.005, 999.1, 655, 615, 638, 791
  See application file for complete search history.

(56) References Cited

U.S. PATENT DOCUMENTS

| | | | |
|---|---|---|---|
| 9,146,862 B2 | 9/2015 | Bobroff | |
| 9,405,788 B2 | 8/2016 | Kliewe | |
| 9,600,501 B1 | 3/2017 | Fuller | |
| 10,133,767 B1* | 11/2018 | Cole | G06F 16/2322 |
| 2014/0325011 A1 | 10/2014 | Guerin | |
| 2014/0365425 A1 | 12/2014 | Zhao | |
| 2015/0074041 A1 | 3/2015 | Bhattacharjee et al. | |
| 2017/0147618 A1 | 5/2017 | Geissinger et al. | |
| 2017/0177698 A1 | 6/2017 | Lee | |
| 2017/0262489 A1* | 9/2017 | Seo | G06F 16/2379 |
| 2018/0173747 A1 | 6/2018 | Baird | |

OTHER PUBLICATIONS

Diaconu, Cristian, et al., "Hekaton: SQL server's memory-optimized OLTP engine." *Proceedings of the 2013 ACM SIGMOD International Conference on Management of Data.* ACM, 2013 (12 pages).

Grund, Martin, et al., "HYRISE: A Main Memory Hybrid Storage Engine." *Proceedings of the VLDB Endowment* 4.2 (2010) (12 pages).

Harizopoulos, Stavros, et al., "OLTP Through the Looking Glass, and What We Found There." *Proceedings of the 2008 ACM SIGMOD international conference on Management of data.* ACM, 2008, pp. 981-992.

Hertz, Matthew, and Emery D. Berger, "Quantifying the performance of garbage collection vs. explicit memory management." ACM SIGPLAN Notices. vol. 40. No. 10. ACM, 2005 (14 pages).

Johnson, Ryan, et al., "Shore-MT: a scalable storage manager for the multicore era." *Proceedings of the 12th International Conference on Extending Database Technology: Advances in Database Technology.* ACM, 2009, pp. 24-35.

Oracle, "Using Oracle TimesTen Application—Tier Database Cache to Accelerate the Oracle Database," Oracle White Paper, Oct. 2014 (24 pages).

Oracle, "Guide to Database Performance and Tuning: Row Cache Enchancements, a feature of Oracle Rdb," Aug. 2003 (14 pages). [online] Available at: http://www.oracle.com/technetwork/products/rdb/0308-row-cache-712a-134300.pdf.

Robertz, Sven Gestegard, and Roger Henriksson, "Time-triggered garbage collection: robust and adaptive real-time GC scheduling for embedded systems." ACM SIGPLAN Notices. vol. 38. No. 7. ACM, 2003 (10 pages).

SAP, "Performance Scalability Enhancements in SAP Adaptive Server Enterprise: A Discussion on Scalability Enhancements in SAP ASE 16.0," 2014 (27 pages). [online] Available at: https://assets.cdn.sap.com/sapcom/docs/2015/08/1078f9b9-567c-0010-82c7-eda71af511fa.pdf#pdfjs.action=download.

SAP, "Release Bulletin for HP-UX," Sep. 3, 2015 (20 pages) [online] Available at: https://help.sap.com/doc/a61700aabc2b1014a7b69a11c72a0364/16.0.2.0/en-US/SAP_ASE_Release_Bulletin_HP_en.pdf.

SAP, "*What's New in SAP ASE 16 SP02*". 2016 (38 pages) [online] Available at: https://www.sap.com/documents/2016/06/02a21e18-767c-0010-82c7-eda71af511fa.html.

Sikka, Vishal, et al., "Efficient transaction processing in SAP HANA database: the end of a col. store myth." *Proceedings of the 2012 ACM SIGMOD International Conference on Management of Data.* ACM, 2012, pp. 731-741.

Stonebraker, Michael, et al., "The end of an architectural era (its time for a complete rewrite)." *Proceedings of the 33rd international conference on Very large data bases.* VLDB Endowment, 2007 (10 pages).

* cited by examiner

700

```
Function imrs_generate_vrid (Database d, Partition p, ProcessId pid):
    /* get in-memory page for this thread. */
    partition_vrid = get_in_memory_page(p, pid)

/* page is not yet created or full */
    if (partition_vrid->page_no == 0) {
        /*
        ** reserve next page number to use within database for this partition.
        ** Use Compare and Swap to replace last known page id with next
        ** page id. If compare and swap succeeds this partition gets next_page_id
        ** as page number for use in this partition.
        */
        do
        {
            last_page_id = d->last_generated_pageid
            next_page_id = last_page_id + 1;
        while (COMPARE_AND_SWAP(d->last_generated_pageid, last_page_id, next_page_id);
        partition_vrid = (next_page_id, 0);
    }

/* insert a row in page in partition vrid. */
    do
    {
        last_rid_used = partition_vrid;
        next_rid = last_rid_used;
        next_rid.row_num = last_rid_used.row_num + 1;
    } while (COMPARE_AND_SWAP(partition_vrid, last_rid_used, next_rid);

return next_rid;
}
```

FIG. 7

```
/* Transaction information structure */
typedef struct tran_info
{
        /* Number of versions pointing to it */
        int             t_vercnt;
        /* commit timestamp of this transaction */
        int             t_commit_ts;
        /* Row version list pointer */
        ROW_VERSION     *t_verlistp;
} TRANINFO;
/* In memory page structure */
typedef struct m_page
{
        /*
        ** Number of rows accessible through this page.
        ** Decremented when row is made inaccessible through this page.
        ** Once this becomes zero, this page is also made inaccessible.
        */
        int                     p_referencing_rowcnt;
        /*
        ** Number of rows back pointing to this page.
        ** Decremented when a back pointing row is GC'ed.
        ** One this becomes zero, this page is GC'ed.
        */
        int                     p_rowcnt;
        /* Row pointers to reach out to rows on it */
        ROW_HEADER              *p_rowhdr[NUMBER_OF_ROWS_IN_PAGE];
} M_PAGE;
/* Row header */
typedef struct row_header
{
        /*
        ** Number of versions pointing to it.
        ** Once this becomes zero, the row header it GC'ed.
        */
        int                     r_vercnt;
        /*
        ** Keep count of the row.
        ** A version is not GC'ed if this is not zero.
        */
        int                     r_keepcnt;
        /* ID of the row */
        ROW_ID                  r_id;
        /* Back pointer to the page this row belongs to */
        M_PAGE                  *r_pagep;
} ROW_HEADER;
```

```c
/* Function to make a row inaccessible */
void
unlink_row(ROW_HEADER *rowhdr)
{
        M_PAGE      *pagep;
        pagep = rowhdr->r_pagep;
        /* Remove row's entry from the page */
        REM_ENTRY(pagep, rowhdr);
        /* Decrement the #rows accessible through this page */
        pagep->p_referencing_rowcnt--;
        /* Of zero rows accessible from this page, make this page inaccessible */
        if (pagep->p_referencing_rowcnt == 0)
        {
                UNLINK_PAGE(pagep);
        }
}
/* Function to free the row version memory */
void
free_version(ROW_VERSION *ver)
{
        ROW_HEADER  *rowhdr;
        TRANINFO    *tinfo;
        rowhdr = ver->v_rowhdr;
        tinfo = ver->v_traninfo;
        /* Free the version */
        MEMFREE(ver);
        /* Decrement the #versions in traninfo */
        tinfo->t_vercnt--;
        /* Free traninfo if #versions has become zero */
        if(tinfo->t_vercnt == 0)
        {
                MEMFREE(tinfo);
        }
        /* Same for row header */
        rowhdr->r_vercnt--;
        if (rowhdr->r_vercnt == 0)
        {
                free_rowhdr(rowhdr);
        }
        return;
}
/* Row version */
typedef struct row_version
{
        /* Back pointer to the row header */
        ROW_HEADER         *v_rowhdr;
        /* Back pointer ot the traninfo */
        TRANINFO           *v_traninfo;
        /* Pointer to the row data */
        BYTE               *v_datap;
} ROW_VERSION;
```

```
/* Function to free up row header memory */
void
free_rowhdr(ROW_HEADER *rowhdr)
{
        M_PAGE      *pagep;
        pagep = rowhdr->r_pagep;
        /* Free row header */
        MEMFREE(rowhdr);
        /* decrement #rows counter in page */
        pagep->p_rowcnt--;
        /* If #rows has become zero free the page */
        if (pagep->p_rowcnt == 0)
        {
                MEMFREE(pagep);
        }
        return;
}
/* Function to GC a row version */
void
gcFreeRowVersion(ROW_VERSION *ver)
{
        /* If this version is not the latest */
        if (!IS_LATEST_VERSION(ver))
        {
                /* And keep count is non-zero, requeue it ot GC */
                if (ver->v_rowhdr->r_keepcnt > 0)
                {
                        GC_REQUEUE(ver);
                }
                /* Else free it */
                else
                {
                        free_version(ver);
                }
        }
        else
        {
                /* If the row is hot, leave this version */
                if (HOT_ROW(ver->v_rowhdr))
                {
                        return;
                }
                /* Else make it inaccessible and requeue it to GC */
                else
                {
                        unlink_row(ver->v_rowhdr);
                        GC_REQUEUE(ver);
                }
        }
        return;
}
```

FIG. 14

GARBAGE COLLECTION FOR IN-MEMORY ROW STORAGE

CROSS REFERENCE TO RELATED APPLICATIONS

This application claims priority to Indian Provisional Application No. 201741007221, filed Mar. 1, 2017, and U.S. Provisional Patent Application No. 62/521,513, filed Jun. 18, 2017 and entitled "IN-MEMORY ROW STORAGE ARCHITECTURE", the disclosures of which are entirely incorporated herein by reference in their entirety. This application is also related to co-pending U.S. patent application Ser. No. 15/859,175, filed Dec. 29, 2017 and entitled "IN-MEMORY ROW STORAGE ARCHITECTURE", co-pending U.S. patent application Ser. No. 15/859,181, filed Dec. 29, 2017 and entitled "IN-MEMORY ROW STORAGE DURABILITY", co-pending U.S. patent application Ser. No. 15/908,725, filed Feb. 28, 2018 and entitled "INFORMATION LIFE CYCLE MANAGEMENT OF IN-MEMORY ROW STORAGE", co-pending U.S. patent application Ser. No. 15/908,727, filed Feb. 28, 2018 and entitled "LOCK-FREE HASH INDEXING", the disclosures of which are entirely incorporated herein by reference in their entirety.

FIELD

The subject matter disclosed herein relates to methods and apparatus for, among other things, information life cycle management of in-memory row storage architectures.

BACKGROUND

Online Transaction Processing (OLTP) Performance has been a key differentiating feature over the years for database management systems. In recent systems, the focus has been on providing "extreme" OLTP (xOLTP) performance, "extreme" scalability on multiple engine configurations, and so on. The demand for this level of performance is on the rise, going from sub-second, to sub-millisecond, and now microsecond performance. Recent advances in hardware technology, like fast multi-core processors supporting large amounts of memory (often in excess of 1 TB per box), have raised the bar on performance. Providing xOLTP performance on commodity hardware, equipped with multi-core computing architectures, at low total cost of ownership (TCO) has been important to database management system offerings in recent years.

Continuing this advancement in xOLTP capability, database management systems may be enhanced in new directions to leverage the high-end power available on modern multi-core platforms supporting large amounts of memory. Therefore, it may be desirable to provide systems and/or methods for faster database access/processing.

SUMMARY

In some aspects, a method, computer program product, and system are provided. The method, computer program product, and system execute operations for implementing and/or utilizing in-memory row storage architecture. For example, a system can include (or otherwise utilize) at least one processor and/or memory, which can be configured to perform operations including processing a plurality of database statements affecting a plurality of rows in an in-memory row store, the plurality of database statements including a database statement comprising a first database transaction. The operations can further include registering the database statement at a start of execution of the database statement, the start of execution occurring at a first time. The operations can further include unregistering the registered database statement at an end of execution of the database statement. The operations can further include determining, from among the plurality of database statements, a second time at which execution of an oldest currently registered database statement was started. The operations can further include assigning a garbage collection thread to a second database transaction committed at a third time, the second database transaction affecting at least one row of the plurality of rows. The operations can further include activating, when the third time is less than the second time, the garbage collection thread to reclaim memory within the in-memory row store.

In some variations, the operations can further include determining, by the garbage collection thread after the activating, whether a current row version created at the third time is a latest row version of the at least one row, determining, by the garbage collection thread when the current row version is the latest row version, whether the at least one row is transactionally active, and/or removing, by the garbage collection thread when the at least one row is not transactionally active and the current row version is the latest row version, the current row version from the in-memory row store.

In some variations, the operations can further include determining, based on a time at which the at least one row was last accessed, whether the at least one row is transactionally active and/or marking, when the at least one row is not transactionally active, the at least one row as inactive, the marking comprising storing an indication in a row header for the at least one row, the row header stored in the in-memory row store and comprising at least one pointer to each version of the at least one row that exists in the in-memory row store.

In some variations, the operations can further include storing one or more row versions for the at least one row in the in-memory row store, wherein each of the one or more row versions comprise a pointer to a row header associated with the at least one row and a pointer to data for the row version and/or storing the row header in the in-memory row store, wherein the row header comprises an indication of a number of row versions pointing to the row header and an identifier for the at least one row. In related variations, the operations can further include determining, by the garbage collection thread, whether a first row version of the at one or more row versions may be removed from the in-memory row store, freeing, in response to determining that the first row version may be removed, memory allocated for the first row version from the in-memory row store, and/or decreasing, in response to determining that the first row version may be removed, the indication of the number of row versions pointing to the row header by a value of one.

In other related variations, the operations can further include determining, by the garbage collection thread, whether the indication of the number of row versions pointing to the row header is zero and/or freeing, in response to determining that the indication is zero, memory allocated for the row header from the in-memory row store. In other related variations, the operations can further include storing a page descriptor within the in-memory row store, wherein the page descriptor comprises an indication of a number rows accessible through the page descriptor, a pointer to a row header for each row accessible through the page descriptor, and an indication of a number of row headers pointing back to the page descriptor.

In other related variations, the operations can further include storing a transaction descriptor for the second database transaction within the in-memory row store, the transaction descriptor comprising an indication of the third time, an indication of a number of row versions pointing to the transaction descriptor, and one or more pointers to the row versions pointing to the transaction descriptor and/or processing, by the garbage collection thread after the activating, the row versions pointing to the transaction descriptor to reclaim memory within the in-memory row store based on removing older row versions that are not transactionally active. In related variations, the operations can further include modifying, by the garbage collection thread, a current row version of the one or more row versions to make the current row version inaccessible for access, wherein a first pointer to the current row version is stored within the transaction descriptor, freeing, after all registered statements accessing the current row version become deregistered, memory occupied by the current row version, and/or queueing, after the freeing, the current version for later processing by the garbage collection thread based on adding a second pointer to the current row version into the transaction descriptor.

In some aspects, the first time is the same as the second time, wherein the oldest registered statement comprises the first database transaction, and wherein the second database transaction is not registered. In some aspects, In some aspects, each of the first time, the second time, and the third time comprise a counter that is incremented for each database transaction that is committed to the in-memory row store. In some aspects, the plurality of database statements comprise at least one of an insert operation, a select operation, an update operation, and a delete operation.

Implementations of the current subject matter can include, but are not limited to, systems and methods consistent with the present description, including one or more features as described, as well as articles that comprise a tangibly embodied machine-readable medium operable to cause one or more machines (e.g., computers and/or the like) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, and/or the like.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

BRIEF DESCRIPTION OF THE DRAWINGS

FIG. 7 illustrates an algorithm for VRID generation, in accordance with some implementations;

FIG. 12 illustrates pseudocode for implementing garbage collection, in accordance with various implementations;

FIG. 13 illustrates additional pseudocode for implementing garbage collection, in accordance with various implementations;

FIG. 14 illustrates additional pseudocode for implementing garbage collection, in accordance with various implementations;

Where practical, like labels are used to refer to the same or similar items in the figures.

DETAILED DESCRIPTION

As noted above, database management systems may be enhanced to leverage the high-end power available on modern multi-core platforms supporting large amounts of memory. At least some of the subject matter described herein relates to systems and methods for providing an in-memory row storage architecture.

Figure 1:
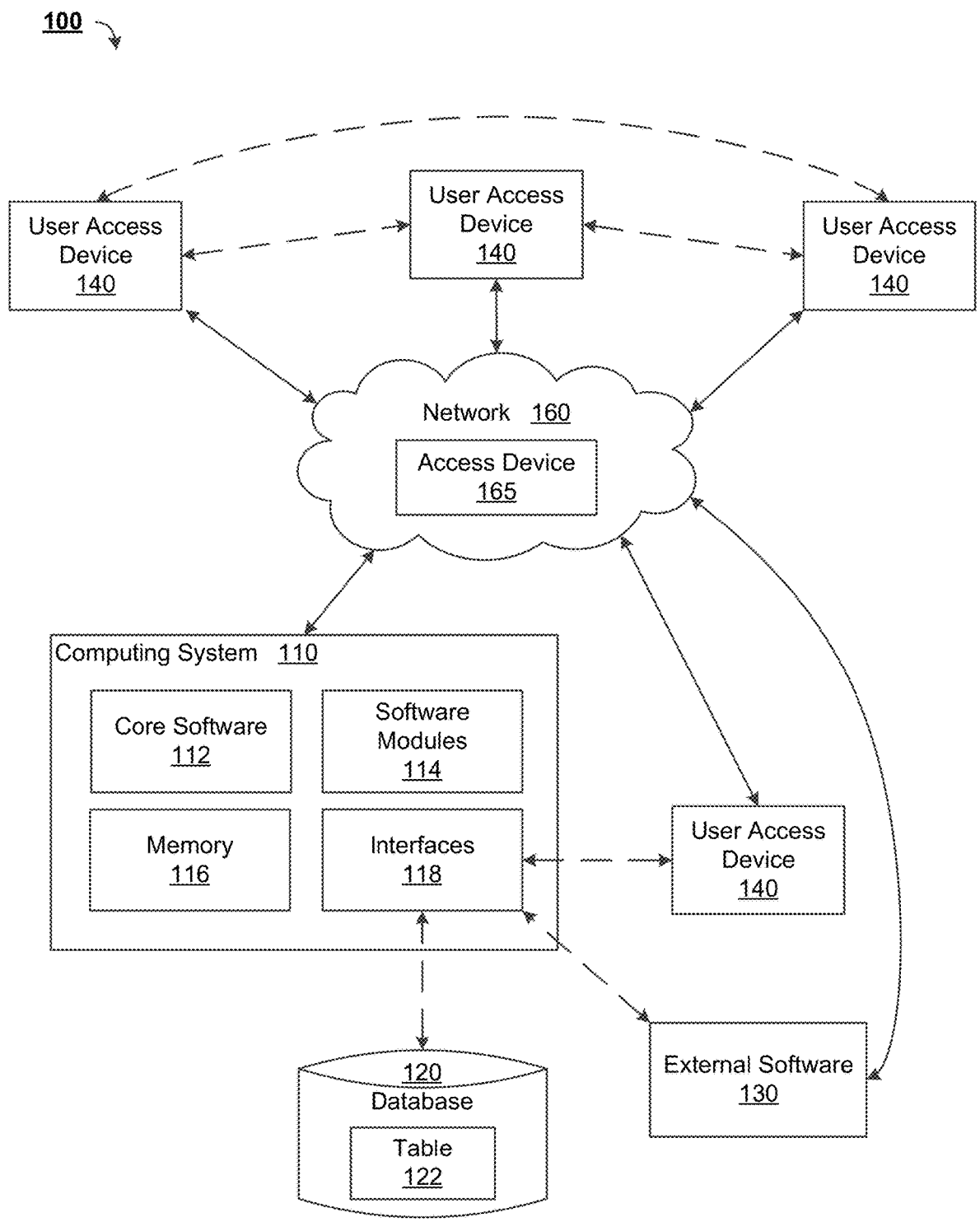
FIG. 1 illustrates a functional block diagram of a system in which features consistent with the described subject matter may be implemented.

FIG. 1 illustrates a functional block diagram of a system 100 in which features consistent with the described subject matter may be implemented. As illustrated, the system 100 can include a computing system 110 capable of communicating with one or more user access devices 140. In some aspects, the computing system 110 can utilize one or more interfaces 118 for communication. Communication among the devices of the system 100 can be through the use of direct communications, such as through the use of a wireless connection like Bluetooth, near-field communication (NFC), ZigBee, and/or the like, and/or a hard wire connection such as universal serial bus (USB). Communication can additionally or alternatively occur through indirect communications, such as over a network 160 (e.g., a local area network, a wide area network, a wireless network, the Internet, or the like).

Communication over the network 160 can utilize a network access device 165, such as a base station, a Node B, an evolved Node B (eNB), an access nodes (ANs), a hotspot, and/or the like. In some aspects, any of the user access device 140 can include personal computers, desktop computers, laptops, workstations, cell phones, digital media devices, smart phones, smart watches, PDAs (personal digital assistants), tablets, hardware/software servers, sensors, sensor devices, terminals, access terminals (ATs), mobile stations, user equipment (UE), subscriber units, and/or the like. Wired or wireless communication among the computing system 110 and user access devices 140 can occur according to various protocols and/or access technologies (e.g., Global System for Mobile Communication (GSM), Universal Mobile Telecommunications System (UMTS), technologies developed by IEEE such as Wi-Fi and/or Bluetooth, technologies developed by the Third Generation Partnership Project (3GPP) or 3GPP2 such as Long Term Evolution (LTE) and/or CDMA2000, and/or the like.).

As illustrated, the computing system 110 can include core software 112 and/or one or more software modules 114. The core software 112 can provide one or more features of a high-level programming software system. The software modules 114 can provide more specialized functionality. For example, the core software 112 and/or software modules 114 can include database management features, such as those described herein. In some aspects, the core software 112 or other similar software/hardware can be capable of accessing a database layer, such as the database 120, which includes at least one table 122, which can in turn include at least one column. The database table 122 can store any kind of data, potentially including but not limited to definitions of business scenarios, business processes, and one or more business configurations as well as transactional data, metadata, master data, and/or the like. relating to instances or definitions of the business scenarios, business processes, and one or more business configurations, and/or concrete instances of data objects and/or business objects that are relevant to a specific instance of a business scenario, business process, and/or the like.

In some aspects, one or more of the software modules 114 can be configured to utilize data stored in the memory 116, data stored in the database 120, and/or data otherwise accessible to the computing system 110. As further illustrated, the computing system 110 can be capable of utilizing external software 130. In some aspects, the external software 130 can provide additional functionalities or services which may not be available at the computing system 110. In some aspects, the external software 130 may include cloud services. In some aspects, the computing system 110 can aggregate or otherwise provide a gateway via which users can access functionality provided the external software 130. In some implementations, the database 120 and/or the external software 130 can be located across one or more servers, and/or communication among the computing system 110, the database, and/or the external software 130 can occur over the network 160.

At least a portion of the illustrated system 100 may include hardware and/or software that interacts with a database, users, and/or other software applications for defining, creating, and/or updating data, for receiving, handling, optimizing, and/or executing database queries, and/or for running software/applications (e.g., software modules 114, and/or external software 130) which utilize a database. In some aspects, the database 120 can be a structured, organized collection of data, such as schemas, tables, queries, reports, views, and/or the like, which may be processed for information. The database 120 may be physically stored in a hardware server or across a plurality of hardware servers. The database 120 may include a row store database (or a column store database) and/or the computing system 110 may be configured to perform OLTP (online transaction processing) and/or OLAP (online analytical processing), which can include complex analytics and tasks. Any of the data stored in the database 120 can additionally or alternatively be stored in the memory 116, which may be required in order to process the data.

In some aspects, the core software 112 can be configured to load the information from the database 120 to memory 116 (e.g., main memory) in response to some event and/or determination. For example, in some aspects, data may be retrieved from the database 120 and/or loaded into the memory 116 based on receipt of a query instantiated by a user or computer system, which can occur through one or more user access device 140, external software 130, and/or the like. In some implementations, at least a portion of the data for the database 120 can reside in-memory (e.g., in random-access memory (RAM)), within the memory 116, for example. In some aspects, data stored in-memory can be accessed faster than data stored in long term storage (also referred to herein as "on disk").

Although the database 120 can be illustrated as described as being separate from the computing system 110, in various implementations, at least a portion of the database 120 can be located within the memory 116 of the computing system 110. Procedures for handling how, when, and why data can be stored in-memory and/or on disk are described herein. The overall architecture of a system with data spanning both in-memory and on disk can be referred to as a storage architecture.

Figure 2:
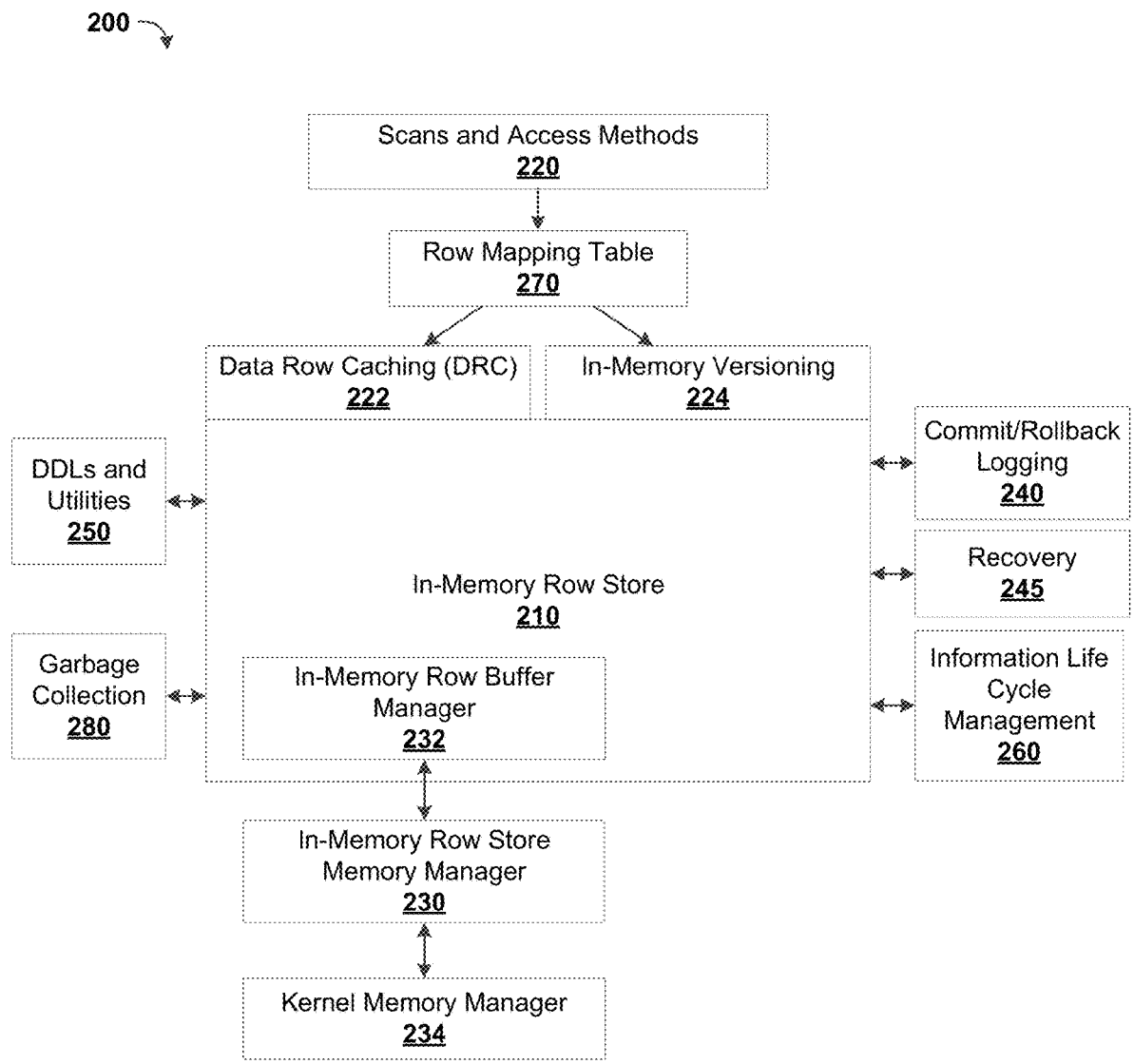
FIG. 2 illustrates components supporting at least a portion of a storage architecture (SA), in accordance with some example implementations.

FIG. 2 illustrates components supporting at least a portion of a storage architecture (SA) 200, in accordance with some example implementations. As illustrated, an in-memory row store (IMRS) 210 can be at the center of the SA 200 and/or many of the components of the SA 200 can communicate with the IMRS 210. As further illustrated, the SA 200 can include scans and access methods 220, a row mapping table 270, data row caching (DRC) 222, in-memory versioning 224, an in-memory row buffer manager 232, an IMRS memory manager 230, a kernel memory manager 234, commit/rollback logging 240, recovery 245, information life cycle management (ILM) 260, data description language (DDL) structures and utilities 250, and/or garbage collection 280. One or more of the components of the SA 200 can be implemented via software and/or hardware, such as through physical storage device(s), processor circuit(s), and/or programming language instructions. In some aspects, the SA 200 can be regarded as a level-2 overall architecture. In some aspects, the SA 200 can be configured for delivering OLTP/xOLTP performance.

Important functionalities supported by the SA 200 can include (1) an in-memory row store and/or access layers (e.g., Data Row Caching) tightly integrated with other database management system components; (2) a singular product offering enhancements (e.g., to minimize the adoption hurdles when existing Enterprise resource planning (ERP) and/or Financial Services industry (FSI) customers evaluate new database management system offerings to upgrade to from their current installations); (3) simple upgrade paths for existing installations and/or users; (4) technologies to enhance OLTP performance without destabilizing existing sub-systems, which can continue to execute for legacy (e.g., non-xOLTP) applications; (5) continued support for relevant and/or frequently used existing features of database management systems in conjunction with the IMRS; and/or (6) incremental rollout of additional xOLTP performance enhancements to various database management sub-systems.

Definitions can be provided for functionality supported by the SA 200, which can aid in delivering xOLTP performance on data-rows-locked tables in an symmetric multiprocessing (SMP) installation, for example. Tight integration of new technologies and/or functionalities with existing database management system capabilities can provide an important differentiating feature. Along with enhanced performance, application compatibility with current features, ease of migration to a new architecture, and/or seamless transition at run-time to the new capabilities are some potential advantages of the SA 200. These advantages can provide high performance for large classes of business suite (BS) applications in a variety of industry verticals utilizing database management systems as the underlying database engine, and/or for transactional workloads in markets in which certain database management systems are dominant.

References to the SA 200 herein can refer to the entire architecture or some portion thereof. For example, functionality described with respect to the SA 200 can be implemented using one more of the illustrated components of the SA 200, one or more components which are not explicitly illustrated, some combination thereof, and/or the like.

In some implementations, transactionally active data can be memory-resident (e.g., stored in-memory) and/or a database engine can provide enhanced performance for electronic transactions operating on the transactionally active data. In some aspects, transactionally active data can include data which is accessed a certain number of times, accessed according to a certain frequency, of a certain type, for critical transactions, and/or the like, and may also be referred to herein as "hot" data. The IMRS 210 can provide a row-oriented caching layer, outside of long term storage/persistence, to host hot data and/or deliver enhanced performance for transactions operating on such hosted data.

Figure 3:
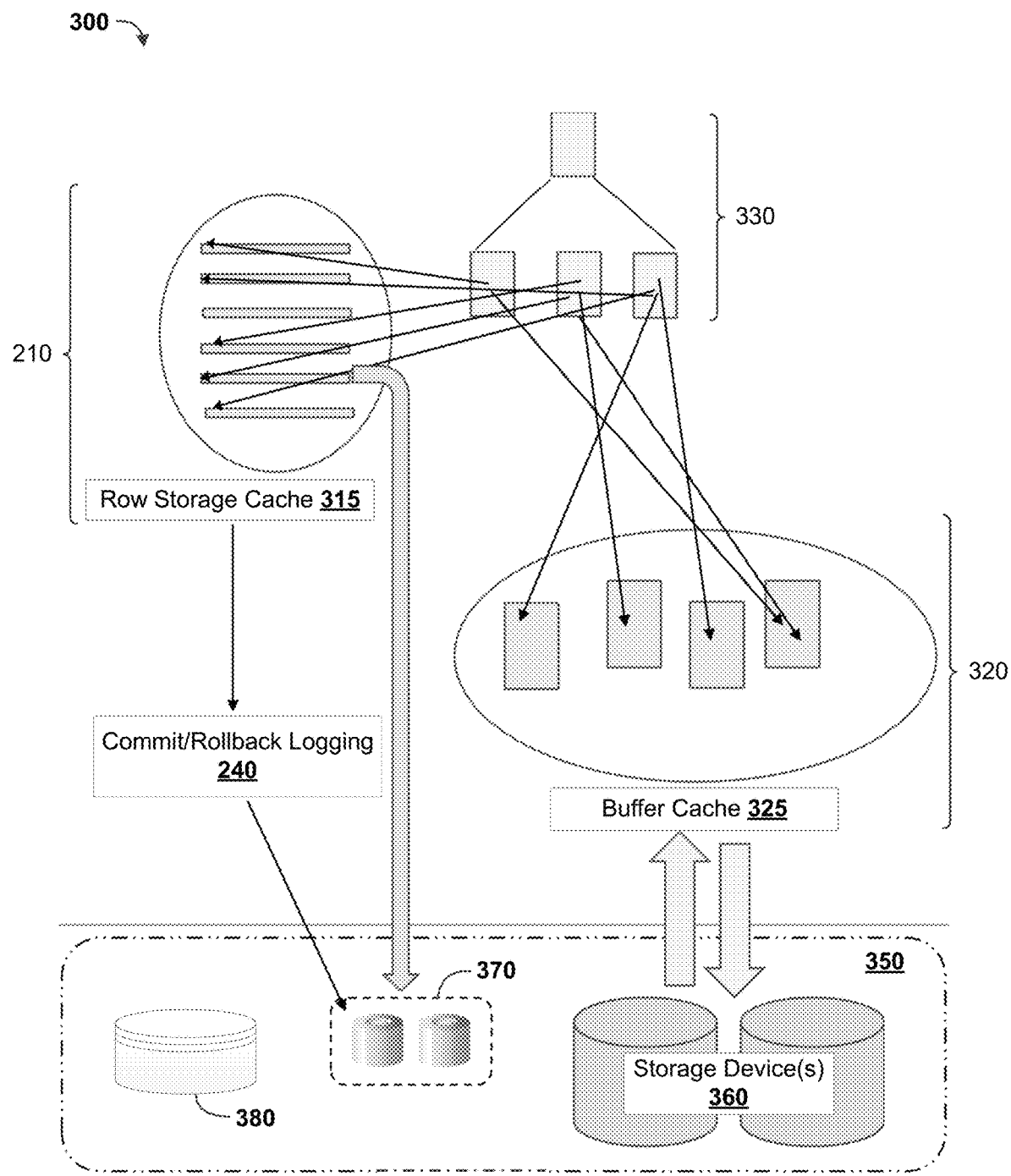
FIG. 3 illustrates a system including components supporting an IMRS, in accordance with some example implementations.

FIG. 3 illustrates a system 300 including components supporting an IMRS 210, in accordance with some example implementations. In some aspects, the system 300 can be similar to the SA 200 of FIG. 2. As illustrated, the system 300 can include the IMRS 210, a row storage cache 315, a page-based storage 320, a buffer cache 325, an index 330, and additional memory 350.

The page-based storage 320 can include page-based, disk-resident storage for data (e.g., data rows and/or index rows), which may be loaded in and/or out of one or more buffer caches 325. However, in some aspects, the page-based storage 320 can include other information and/or be stored according to another format. The index 330 can include a B-tree index and/or multiple levels. The additional memory 350 can include one or more storage device 360 (e.g., hard disk), an IMRS log 370, and/or a system log 380. Commit/rollback logging 240 can leverage the IMRS log 370 in the event the system 300 (or some component thereof) crashes, is turned off, is reset, and/or the like.

As illustrated, the index 330 can span the IMRS 210 and the page-based storage 320. When data (e.g., a row) is required for operation, the index 330 can locate the data regardless of whether the data is located in the IMRS 210 and/or the page-based storage 320. As further illustrated, the index can include multiple levels.

The rows hosted in the IMRS 210 can be accessed (e.g., using a select operation) and/or modified (e.g., using an UPDATE and/or DELETE operation) at various isolation levels (e.g., level-0, level-1, level-2, level-3, and/or the like). The IMRS 210 can provide a data store layer, providing access to the rows at the desired isolation level and/or at the right interface/coupling needed by a query processing layer. The IMRS 210 can also be referred to as the row storage cache 315 and/or including the row storage cache 315.

In some implementations, a tightly-integrated IMRS 210 can be added to database management systems and/or provide full indexing support for data that is resident in the IMRS 210. The IMRS 210 can provide the backbone for performance-oriented features for database management systems. For example, storage models can be designed to reflect a data life cycle intrinsic to certain kinds of transaction workloads, so that performance commensurate with the data life cycle can be delivered through storing rows in-memory and/or on a disk-based page store. Fully durable, ACID (Atomicity, Consistency, Isolation, Durability) compliance can be provided to the data resident in the IMRS 210. Full archive management can be provided through a backup server supporting operations of a database containing data resident in the IMRS 210.

Figure 4:
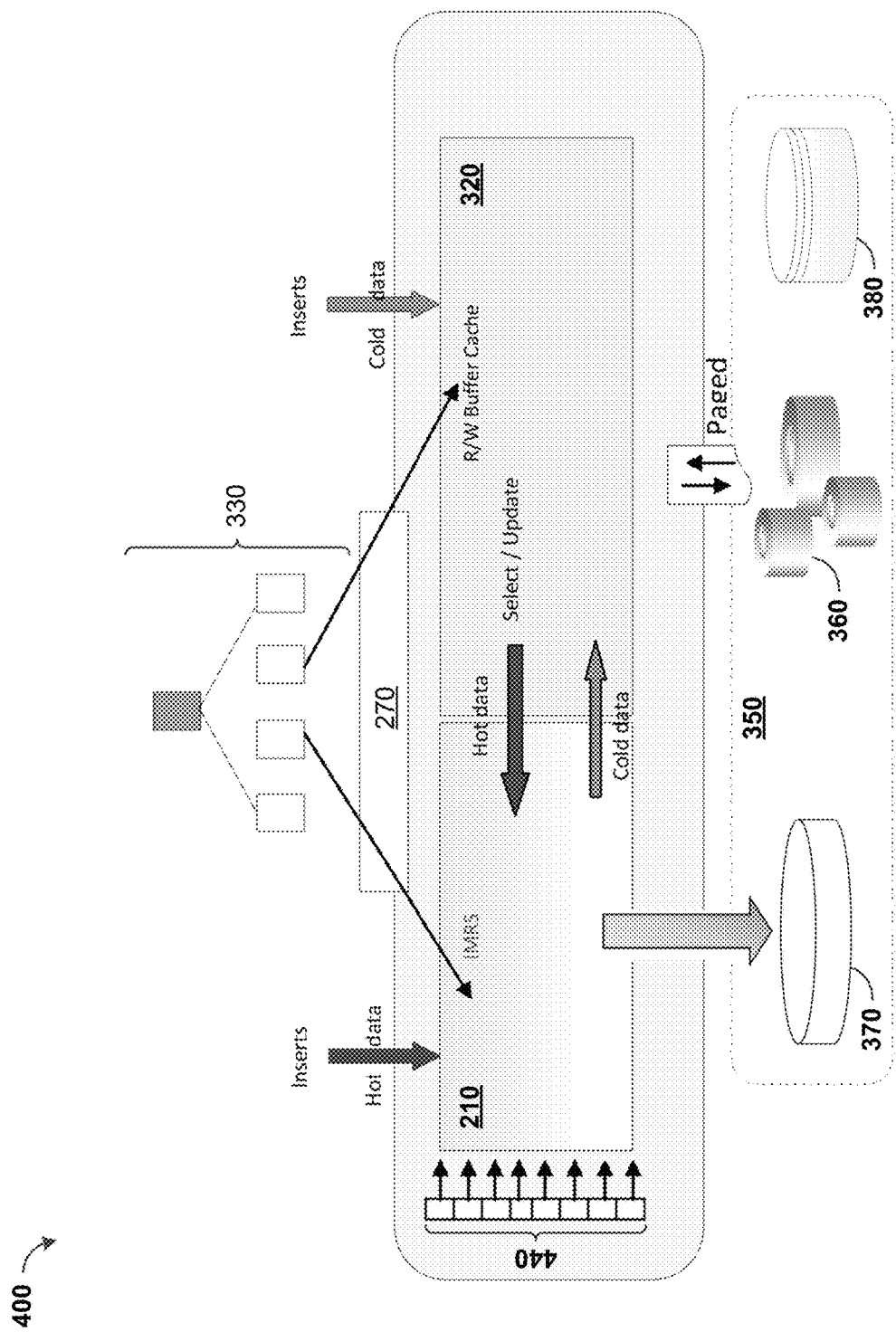
FIG. 4 illustrates another system including components supporting an IMRS, in accordance with some example implementations.

FIG. 4 illustrates another system 400 including components supporting an IMRS 210, in accordance with some example implementations. In some aspects, the system 400 can be similar to the system 300 of FIG. 3.

In some aspects, the IMRS 210 can be configured to host different types of rows, such as inserted rows, migrated rows, cached rows, other row types, and/or the like. Inserted rows can be rows that are newly inserted to an IMRS-enabled table, which can go directly to the IMRS 210 without a page-resident image of the row in the page-based storage 320. Future updates to such rows can continue in the IMRS 210, but the row may still be referred as an inserted row. Migrated rows can include rows that reside in the page-based storage 320 but are subsequently migrated to the IMRS 210. If rows are migrated, for updates or deletes or the migrated rows the contents of the row in the IMRS 210 can be the latest version and/or the version of the row in the page-based storage 320 may be stale. Cached rows can refer to rows that reside in the page-based storage 320 but are frequently accessed, and hence can be cached within the IMRS 210 (e.g., without changes to their contents). The contents of the cached rows in the IMRS 210 and their original image in the page-based storage 320 can be identical.

The IMRS 210 may be configured to host all rows of a new or existing table entirely in-memory. This can lead to an in-memory "hot" table. Similarly, if individual partitions are enabled to use the IMRS 210 and/or sufficient memory is provided by the system 400 for the IMRS 210, then all rows of a partition may be memory-resident. This can lead to a "hot" partition storage model. For truly hot tables and/or partitions, with appropriate memory configuration hooks and/or DDL support the portion of the table and/or partition in the page-based storage 320 may be empty. This can lead to potential access optimizations. For VLDB (Very Large Database) tables, the IMRS 210 may hold only some of the most active rows from a table and/or partition. The rest of the less active rows can continue to be stored in the page-based storage 320 and/or be accessed by page-based and/or buffer cache methods. This usage of the IMRS 210 can be referred to as a "hot data" model, where the tables' and/or partitions' data can be partially in the IMRS 210 and partially in the page-based storage 320. In some aspects, a table can be regarded as an organizational database structure having multiple database partitions. In some aspects, a database partition can be regarded as an organizational database structure having multiple rows comprising data.

Some database management system architectures can follow a page-based disk-resident storage model with a buffer cache providing the in-memory storage for page-based data. However, this model can suffer from some performance issues, such as latching overheads for data and/or index pages, locking overheads, length of code-path issues, run-time logging overheads, others issues in the area of concurrency and/or blocking between concurrent readers and/or updaters of data, and/or the like. The IMRS 210, on the other hand, can provide for delivery of enhanced performance for transactions operating on hot data, of storage models that intrinsically reflect the information life cycle of transactional data, and/or the like.

The IMRS 210 can be defined to support "hot tables" and/or "hot data." Hot tables can include a database table that is entirely memory-resident, being frequently scanned, and/or being frequently updated. Hot data can include portions of a database table that are transactionally active, where remaining data from the database table is memory-resident. In some implementations, transactional data can be regarded as "hot" (e.g., frequently accessed and/or modified), "warm" (e.g., occasionally accessed and/or updated), and/or "cold" (e.g., infrequently accessed and/or rarely updated). In some aspects, transactional data can be broadly classified as active or passive data. Defining an architecture that can provide enhanced performance for transactions operating on hot data can be desirable. Similarly, providing storage and/or access models that reflect the usage pattern of data based on their access patterns can be beneficial.

Providing an expected usage model for transactional data can involve creating and/or inserting a data record(s) into a database and accessing and/or modifying the data record(s) for some period of time/activity following the creation and/or insertion. Once a transaction "completes" (e.g., once data records are updated), previously active data rows tend to be less frequently accessed and/or updated, thereby becoming passive data. Occasionally (e.g., periodically), passive data may be re-activated by regularly occurring events (e.g., end of quarter accounting, end of year accounting, targeted sales promotions, and/or the like), at which time data may become active again. However, over time, passive data often becomes inactive, at which time a less-efficient storage and/or access mechanism can be preferred for such data.

In some aspects, insert, select, update, and/or delete operations (ISUDs) on transactionally hot data can be driven by fully-qualified index access. In some aspects, tables can be required to have at least one index, which might not be required to be unique. However, tables in the schema of an OLTP system can be expected to have a primary key index and/or one or more unique indices. Secondary indices can also be defined on such tables. Access of an entire table (e.g., table scans) can be expected to either not occur or rarely occur in a workload. Updates can typically change non-index key columns, and/or the index key columns of primary or unique indices may rarely, if ever, be updated. Operational activities such as building indices and/or defragmenting tables may not occur on active data and/or can be scheduled to occur during off-hours of activity.

In-Memory Row Store 210

The IMRS 210 can provide a high-performance, in-memory row store for active data. Data that is transactionally active can reside in the IMRS 210, which can be enabled as a per-partition storage repository for hot data (e.g., hot tables or hot partitions) and/or can be an extension of the page-based storage 320. The IMRS 210 can be both a store and a cache in that it can provide a memory-based storage repository for active data rows which are frequently updated. The IMRS 210 can also provide a repository for caching active rows that are frequently selected, which can act as an efficient cache for hot rows between a buffer cache 325 and user queries. Additionally or alternatively, a query-processing-friendly row format (QPFRF) can be created for frequently selected rows to act as another "row-caching" layer on top of the IMRS 210 data row to accelerate performance (e.g., when performing a select operation).

A QPFRF can include an internal layout of frequently selected rows in the IMRS 210, oriented in a manner such that the column values can be accessed directly from values in the IMRS 210 rows and/or without requiring further alignment or data copying to query processing structures. This format of the IMRS 210 data row can be generated based upon access criteria such as frequency of access. A QPFRF row can be manufactured for frequently scanned rows from the IMRS 210 that are mostly only read (e.g., as opposed to mostly written).

Figure 5:
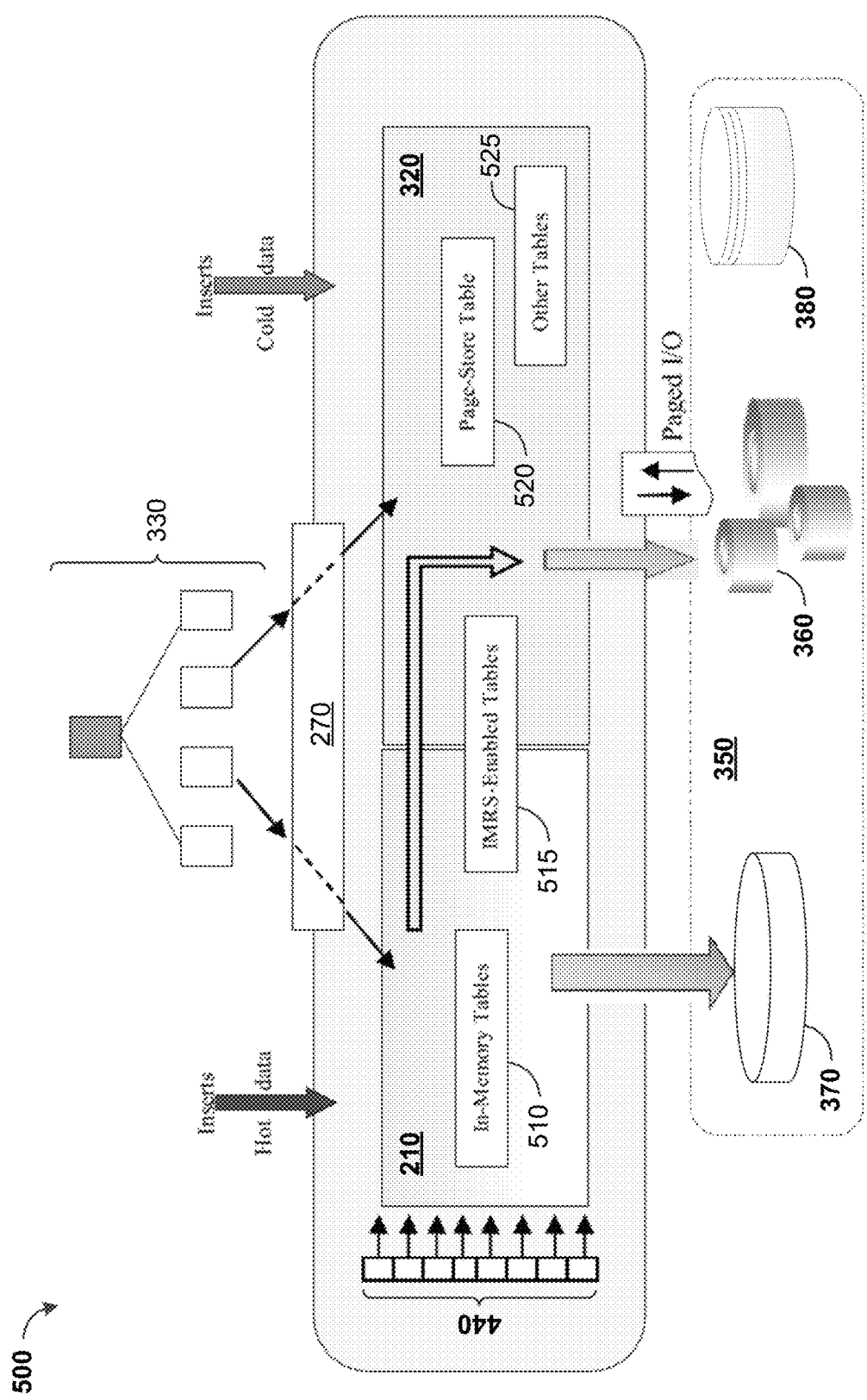
FIG. 5 illustrates another system including components supporting an IMRS, in accordance with some example implementations.

FIG. 5 illustrates another system 500 including components supporting an IMRS 210, in accordance with some example implementations. In some aspects, the system 500 can be similar to the system 400 of FIG. 4.

In some aspects, not all tables are expected to be memory-resident. For example in some implementations, only a small number of hot tables in an OLTP schema may be expected to completely leverage the IMRS 210 model, which may be referred to as in-memory tables 510. Tables that are defined or altered to use the IMRS 210 can be referred to herein as IMRS-enabled tables 515. In some aspects, IMRS-enabled tables 515 can be configured for use within both of the IMRS 210 and the page-based storage 320. DDLs and utilities 250 (e.g., DDL functions and/or extensions) can be provided to define new tables as being IMRS-enabled and/or to alter existing tables to leverage the IMRS 210. Tables which reside fully on the page-based storage 320 can be referred to as page store tables 520. Other tables 525 may also exist.

Data residing in the page-based storage 320 can be read into a buffer cache 325, which can provide the input and output (I/O) channel for reading and/or writing pages from and/or to disk (e.g., within a storage device 360). The IMRS 210 can provide an in-memory storage layer where frequently accessed data rows can exist in an uncompressed format and/or in a layout that can provide for efficient access and/or manipulation by a query processing execution engine.

In some implementations, new data may be initially inserted into only the IMRS 210 (e.g., in-memory), remain in the IMRS 210, and/or be accessed and/or updated directly in the IMRS 210. In some aspects, a table including such newly inserted data can include a union of rows found (if at all) in the page-based storage 320 (some of which may have been buffered in the buffer cache 325) and rows in the IMRS 210.

Database tables can have a primary key index and/or some other unique index. The rows for a given table in the IMRS 210 can be stored in per-partition based structures so that partition-specific scanning can be supported when needed. In some aspects, different forms of indices, unique and non-unique indices, local and global indices, and/or the like can be allowed on multi-column composite keys.

The IMRS 210 can provide a repository for older versions of rows that are updated, such as when versioned rows are chained in reverse chronological order of the update sequence. Rows that exist on the page-based storage 320 when they are updated can result in a new row being inserted into the IMRS 210, with the page-based row becoming the prior version for the updated row in the IMRS 210.

A disk-resident fully durable database (DRDB) enabled for IMRS 210 usage can include a database supporting all of the ACID properties and/or providing full support for load database operation and/or load transaction operation functionality. A DRDB enabled for IMRS 210 can differ from other in-memory database offerings where the entire database is fully in-memory, as an IMRS-enabled database may only require and/or utilize a portion of the database in-memory. For a VLDB installation, due to constraints on available memory and costs thereof, an IMRS-enabled database can be more practical (e.g., than a fully memory-resident database) to achieve the required OLTP performance. An IMRS-enabled database can include a disk-resident database enabled for IMRS 210 usage by provisioning a row storage cache.

Row Storage Caches 315

To support IMRS 210 functionality, database management systems can be enhanced to support row-oriented caching, referred to herein as a row storage cache 315. In some aspects, the row storage cache 315 can be similar to a page-based buffer cache 325. Memory can be allocated to a cache of a new row storage type and/or memory can be allocated for row-buffers. In some implementations, management of row storage caches 315 can be through cache configuration interfaces, wherein the cache memory can be divided, allocated, and/or freed (e.g., in terms of data row sizes and/or plus any overhead). As the same row storage cache 315 can be shared for data rows from multiple tables with widely varying schemas, allocation and/or freeing patterns can be non-deterministic at run-time. Some base requirements of the row storage cache 315 can be determined and/or inferred based on the schema of tables bound to the row storage cache 315. However, in some implementations, due to presence of variable-length columns and/or in-row large object (LOB) columns (which can be memory-resident), expanding updates, shrinking updates, rollbacks, and/or in-memory versioning for updates, the footprint of memory allocation and/or freeing at run-time can vary depending on the workload and/or data row access patterns.

High-performance row storage caches 315 can be supported by enhancements to the Kernel memory manager 234, providing low-latency, non-blocking, and/or minimal blocking concurrent access to cache memory. An intermediate layer, such as the IMRS memory manager 230, can collaborate (e.g., communicate and/or interface) with the kernel memory manager 234 providing memory management services at the kernel level (keeping the schema and row-usage patterns in perspective) to provide information to the in-memory row-buffer manager 232, which can be optimal/efficient (e.g., in terms of memory usage and/or fragmentation).

Data Row Caching 222

DRC 222 can be a feature built on top of the IMRS 210 to deliver improved performance while scanning and/or updating frequently accessed rows from data-rows-locked tables. Individual tables in a database setup for IMRS 210 usage can be selectively enabled to use DRC 222. DRC 222 can leverage access patterns to data rows and/or attempts to access (e.g., via selects and/or data manipulation language (DML) operations, such as retrieve, store, modify, delete, insert, update, and/or the like) rows directly in the IMRS 210, rather than in the page-based storage 320. Enabling DRC 222 for hot tables can deliver improved performance, especially for high-volume OLTP workloads.

DRC 222 can leverage the capabilities of the IMRS 210 to host data from frequently accessed/modified rows ("hot" rows) in the IMRS 210. Newly inserted rows to an IMRS-enabled table can be inserted first and/or only into the IMRS 210. Subsequent access to those rows for selects or modifications can be provided directly from the IMRS 210. This can be one form of DRC 222 usage of the IMRS 210. Another form of DRC 222 usage can be when existing rows in the page-based storage 320 are updated and/or scanned repeatedly. Another form of DRC 222 usage can be when all/most of the rows in a table are frequently updated (e.g., the available inventory in a warehouse consisting of a reasonably small product list). Such rows/tables can be migrated from the page-based storage 320, hosted in the IMRS 210, and/or subsequent access/modifications to those rows can continue in the IMRS 210.

In some aspects, when DRC 222 is enabled for a table, new inserts can be first inserted to the IMRS 210 without allocating any space in the page-based storage 320. Subsequent updates to such rows can be performed in the IMRS 210. If such rows are then subsequently deleted, the row can be deleted directly from the IMRS 210 without requiring access to the page-based storage 320.

Frequent updates to rows residing in the page-based storage 320 may result in the row being migrated to the IMRS 210. Subsequent updates may then performed to the in-memory version of the row, which can be in an uncompressed format. In some implementations, no data page or buffer access results while updating the row in the IMRS 210. Depending on the access pattern to hot data, some frequently accessed rows may be cached in the IMRS 210 in an uncompressed format. Subsequently, scans to such rows may be performed directly from the IMRS 210, without accessing the data page or data buffers.

Rows residing in the IMRS 210, whether for newly inserted rows or migrated rows, can be accessible via the index 330. Over time, when access to rows in the IMRS 210 decreases, a background task can harvest old and/or cold data rows, move them back to the page-based storage 320, and/or release memory used by such rows back to the IMRS 210. Rows that were newly inserted to the IMRS 210 can be moved to newly allocated pages, whereas existing rows that were migrated to the IMRS 210 from the page-based storage 320 can be migrated back to their original location (e.g., a specific row) on the page-based storage 320.

DRC 222, as a user-visible feature, can be designed to model the storage and access techniques around the data life cycle. Hot data can be preferentially migrated to the IMRS 210, operated in-memory, and/or as data ages-out, transparently moved back to the page-based storage 320 and/or buffer cache 325.

Row Identity (RID) Mapping Table 270

Figure 6:
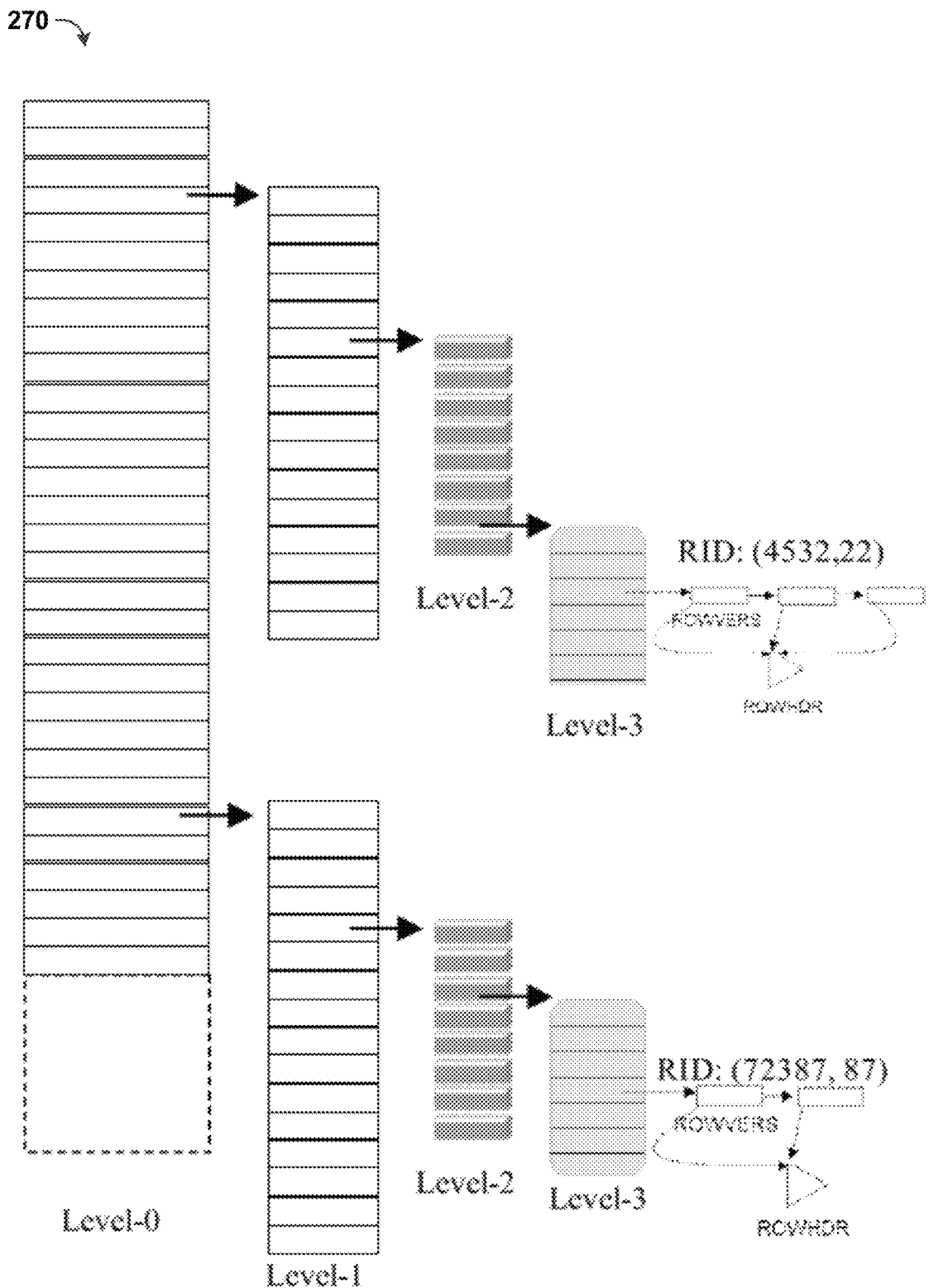
FIG. 6 illustrates a possible layout of the RID mapping table, in accordance with some implementations.

The RID mapping table 270 can include a table that supports index and/or table scans within the SA 200. FIG. 6 illustrates a possible layout of the RID mapping table 270, in accordance with some implementations. The RID mapping table 270 can include a database-wide mapping table having multi-level series of contiguous arrays, mapping a RID (page-ID, row#) to a memory address. Each level of the RID mapping table 270 can map to contiguous chunks of pages in a database's space map. As the IMRS 210 can be designed to hold hot/active rows, only a percentage of existing rows from the page-based storage 320 may be in the RID mapping table 270. In some aspects, the RID mapping table 270 can blossom out to allocate and/or fill out sub-arrays at each level, holding pointers to sub-arrays at the next level (e.g., sub-arrays at level-1 can include pointers to sub-arrays at level-2). Over time, as rows are removed from the IMRS 210, the RID mapping table 270 can shrink to maintain sparseness. For rows that are not in-memory, a probe may return early due to the sparse nature of the sub-levels. The RID mapping table 270 can be managed using efficient, lockless lookups and/or CAS-based updates to grow and/or shrink the memory at different levels.

In some aspects, cached rows stored within the IMRS 210 can initially include read-only rows, but may eventually be updated in-memory. In various implementations, only the in-memory version of the cached row may be updated, whereas the page-based storage 320 image may remain stale. Scan and access methods 220 can be configured to utilize this dichotomy and/or return the latest image of the cached-updated-row from the IMRS 210, using a lookup of the RID mapping table 270.

Row Storage Caches 315

In some aspects, there can be an inherent dependency on the use of DRC 222, as individual features may depend on the existence of a row storage cache 315 being available. In some implementations, only one database-wide row storage cache 315 may be provided, but a per-table row storage cache 315 can additionally or alternatively be provided. In some aspects, a DRC-enabled table can inherit the database's row storage cache 315.

Table 1 shows the behavior of ISUDs for DRC-enabled tables, in accordance with some implementations. In some aspects, for the deletion of rows migrated to the IMRS 210, the page-based storage 320 version of the row can be deleted (and space reclaimed) as a result of a purge operation. In some aspects, the purge operation can be performed (at least in part) via garbage collection 280, as described herein.

TABLE 1

| Operation | Feature |
|---|---|
| Insert | Goes to the IMRS 210 first. Subsequent updates or deletes to rows existing in the IMRS 210 are performed directly in the IMRS 210 without affecting the page-based storage 320. |
| Select | Hot rows that are frequently scanned may be brought to IMRS 210 for row caching (performance benefits). Subsequent selects of these rows return the values directly from the IMRS 210. |
| Update | Occasional updates to some rows that reside on the page-based storage 320 are performed directly on the page-based storage 320. Frequently updated rows may be brought to the IMRS 210, for performance gains for future accesses (e.g., selects and/or updates). Thereafter, updates to such rows are performed in the IMRS 210, without affecting the data page itself. |
| Delete | Performed on the page-based storage 320 when the row is first deleted directly from the page-based storage 320. For delete of a frequently scanned or updated row that was migrated to the IMRS 210, the delete is performed in the IMRS 210 and also from the data page. |

Updates

Updates to rows that are on the page-based storage 320 can continue to be performed on the page-based storage 320. For DRC-enabled tables, run-time heuristics can be applied to identify rows in the page-based storage 320 that are frequently updated and/or relocate the identified rows to the IMRS 210, for improved performance of future selects or updates of such rows. This process can be referred to as row migration. Rows that come into the IMRS 210 due to row migration can be referred to as migrated rows.

In some aspects, as described herein, operations may be logged in the IMRS log 370 for recovery, in the event of system failure, shutdown, restart, and/or the like. Row migration can be a non-logged operation in the IMRS log 370. In anticipation that migrated rows may be re-accessed, rollback of the transaction that caused the row migration can roll back the update itself. However, the migrated row itself may be left in the IMRS 210 as a cached row, in preparation for an immediate access. In other words, the update event itself may be a combination of an unlogged row-caching event, followed by a logged update event. The end result of the row's status in the IMRS 210 can be implementation-defined, subject to available memory and/or other design considerations.

In some aspects, row migration can be performed without updates of indices pointing to the migrated row. The migrated row's RID may not change and/or index scans can be redirected to access the row from the IMRS 210 by looking the migrated row up in the RID-mapping table 270 (e.g., via the scans and access methods 220).

Updates to rows that are in the IMRS 210 (e.g., inserted, cached, and/or migrated rows) can be performed directly in the IMRS 210 without affecting their home-row location (if any) on the page-based storage 320 for migrated and cached rows.

In some aspects, updates of rows in the IMRS 210 can produce new row images for each update, which can consume memory while the transaction is active. Accordingly, the memory for intermediate row versions can be reclaimed, sometime after the transaction completes, via garbage collection 280. A very large transaction performing thousands of updates to the same row could consume memory excessively for intermediate row versions. However, this situation can be mitigated by the availability of garbage collection 280, which can potentially reclaim memory from intermediate versions. The extent to and/or rate at which garbage collection 280 reclaims memory for intermediate versions (e.g., produced by an in-flight transaction) can be determined during implementation and/or at runtime.

In some aspects, the latest version of a row can be in the IMRS 210 and/or the original version in the page-based storage 320 can become stale. Index access to such rows in the IMRS 210 can find the latest version of the row in the IMRS 210. For example, table scans accessing rows from the page-based storage 320 can be configured to return the latest version from the IMRS 210 (e.g., if the row was previously migrated to the IMRS 210).

When the update frequency of a row decreases and/or due to other considerations such as reduced memory available in the IMRS 210, some of the updated rows may be "packed" back to the page-based storage 320 and/or deleted from the IMRS 210, as described herein.

Deletes

Deletes of rows that already reside in the page-based storage 320 can be performed using logged updates on the page-based storage 320. Deletes of inserted rows can be performed as a logged delete in the IMRS log 370. Memory used by the row and/or its intermediate versions can be available for reclamation via garbage collection 280, which can be done after the transaction completes.

Deletes of cached rows can be performed as a logged delete in the page-based storage 320, with logging in the system log 380. The footprint of the cached row in the IMRS 210 can be erased and/or the memory used by the row can be made available for reclamation via garbage collection 280, without resorting to any logging in the IMRS log 370. The system log 380 logging can be performed in-line with the transactional activity using a PLC (Private Log Cache). Memory reclamation can be deferred to after the transaction completes so that run-time transactional performance can be unimpeded (at least in part). If a deleting transaction rolls back, the IMRS 210 version of the row may be safely re-instated without need for further memory allocation or initialization. In some implementations, the cached version of the row can be reinstated following a rollback.

For migrated rows, the IMRS 210 component of the row can be deleted similar to inserted rows. Memory for all versions of the row can be made available to the garbage collection 280 thread for reclamation, which may occur after the transaction completes. In addition, as the migrated row has a counter-part page-resident row-image, the deletion of the row from the page-based storage 320 can be performed as a fully logged operation in the system log 380. In some implementations, logging for the deletion for the page-based storage 320 version of the row can be done in-line with the transactional activity, whereas the logging for the IMRS 210 version can be performed as a commit-time logging operation in the IMRS log 370. In case of a rollback, the page-image version of the row can be restored to its pre-updated image. The final version of the deleted row can be re-instated in the IMRS 210 without an additional memory allocation operation.

Whether the footprint of an IMRS 210 row, such as in the RID-mapping table 270, is erased immediately as part of the commit of a delete or sometime after the transaction completes via garbage collection 280, can be implementation-specific.

Merge

A merge statement can include a two-part statement updating existing rows which qualify and, if not, inserting new rows. It is possible that, for a single merge statement, some rows may be inserted in the IMRS 210 and some other rows may be updated both in the IMRS 210 and the page-based storage 320. If some row-usage threshold(s) are met, some updates under a single merge statement could cause row migration. Logging and/or rollback semantics of the merge statement can be similar to those of the individual insert and/or update components.

Virtual RID (VRID) Generation

In some database systems, each row inserted can have an associated RID (e.g., used to locate a physical memory location for the rows). In some implementations, an RID can include a page identifier and/or row number. For the page-based storage 320, an RID can be generated based on the page in which the row is inserted and/or a row number within that page. However, rows inserted into the IMRS 210 may not have a page-based storage 320 footprint. Thus, an RID may need to be generated for inserted rows. In some aspects, this RID can be referred to as a VRID. A VRID can similarly include a page identifier and/or a row number. However, the page identified by the VRID may be a "virtual" page in the IMRS 210, which can simply include a container for rows and/or might not include metadata, such as metadata associated with page-based storage 320 pages.

To support fast and/or concurrent inserts in-memory, a VRID generation algorithm can use concurrent lockless data structures. For hot partitions with many inserts, a single page per partition could lead to hot spots. Accordingly, the SA 200 can create and/or maintain multiple in-memory pages for inserted rows. In some implementations, each process/connection can select one or more different pages, based on a page identifier. Having the connections select different pages can allow for processing of concurrent inserts, on the same partition by multiple threads, without creating contention for generating VRIDs. If there are a large number of processes/connections, each page of a partition may have a small number of inserted rows. In some implementations, each in-memory page may be designated to store inserted rows from an individual partition. However, there may be no requirement that consecutive pages belong to the same partition(s) (or other object).

FIG. 7 illustrates an algorithm 700 for VRID generation, in accordance with some implementations. The illustrated compare and swap function can be used as a lightweight, lockless synchronization mechanism to generate new page identifiers and/or new row numbers within the same page.

Low or Out-of-Memory in IMRS 210

The SA 200 can be configured to handle low memory and/or out-of-memory conditions (e.g., error states) for IMRS 210 (e.g., for the row storage cache 315) transparently and allow operations (e.g., DML operations) to continue on the page-based storage 320. For example, in some implementations, the SA 200 can prevent new migrations and/or inserts of rows into the IMRS 210 when the IMRS 210 is low and/or out of memory. In order to prevent new migrations and/or inserts, the SA 200 can track a percentage usage of the IMRS 210 and/or the row storage cache 315. For example, if the percentage of utilization increases beyond a threshold (e.g., 70%, 75%, 80%, 85%, 90%, 92.5%, 95%, 100%, and/or the like), then the SA 200 can prevent new rows from being inserted and/or migrated to the IMRS 210, at least until the percentage utilization is decreased to another threshold (e.g., 65%, 70%, 75%, 80%, 85%, 90%, 92.5%, 95%, and/or the like).

In some implementations, the SA 200 can handle low memory and/or out-of-memory conditions while new migrations and/or inserts are processed. For example, if an out-of-memory condition occurs while a new row is being inserted and/or a page-based storage 320 row is being migrated to IMRS 210, the SA 200 can rollback any partial changes made to bring rows in-memory (e.g., any information changed as part of an attempt to insert or migrate a row to the IMRS 210). The insert and/or update can then be transparently redirected to perform the same operation(s) within the page-based storage 320, which can avoid memory errors.

In some implementations, the SA 200 can handle low memory and/or out-of-memory conditions while existing rows are updated. For example, if a row is already present in IMRS 210, then an update and/or delete to this row can be attempted to be processed in IMRS 210 as a first preference, in order to retain hot rows in-memory. If a low memory and/or out-of-memory condition is detected while processing the update and/or delete, then the SA 200 can first pack the committed row to the page-based storage 320, and then redirect the incoming update and/or delete transparently to the page-based storage 320. Packing can ensure that latest committed row is present on page-based storage 320 before update and/or delete modifies the row on page-based storage 320.

Large Object Column Support

A DRC-enabled table's schema can include LOB columns in-row and/or off-row, with the semantics and/or behavior supported for a page-resident table. In some aspects, in-row LOB length criteria and/or limits can apply in relation to a page size of the SA 200. In some aspects, an in-memory row with off-row LOB columns can have the same row format as an on-disk row, such as a format with an embedded text pointer to the first text page (FTP) of an off-row LOB page chain.

Updates to LOB columns for a page-based row, in-row and/or off-row, can operate with little to no modification. However, frequent updates to a row may cause row migration to the IMRS 210, which can be migrated along with a movement of an in-row LOB column to an off-row LOB. Updates to in-row LOB columns for inserted or migrated rows can be done by producing a new in-memory row version with the expanded in-row LOB column. If an update to the in-row LOB columns allow the updated row to be retained in-row, the new row version can store the column value in-memory.

When an update of a LOB column (and/or an expanding update of a variable-length column), causes an in-row LOB value to move off-row, the new row version created can contain a text pointer to the FTP of the off-row LOB page chain. In some aspects, movement of the LOB value from in-row to off-row can be a fully-logged operation in the page-based storage 320, captured in the system log 380. Additionally or alternatively, changes to an in-memory component of a LOB column can be captured in the IMRS log 370 as part of the commit. In some implementations, a shrinking update of an off-row LOB column's value can migrate the value in-row. This shrinking update can result in a logged, page deallocation of of-row LOB page chains in the system log 380, and/or the new in-memory row version can be created with the updated, smaller in-row LOB value.

Frequent updates to a row in the page-based storage 320 may trigger row migration to the IMRS 210. If an in-row LOB column is updated, such that it continues to remain in-row, then the migration process can involve creating and/or caching a new row-version, with the expanded in-row LOB column value, in the IMRS 210. If an in-row LOB column is updated, such that it moves off-row, then the row can be first cached in the IMRS 210 (as part of the migration), and then the off-row LOB column can be allocated as part of migrating the new row version. If an existing off-row LOB column is moved in-row as part of an update and/or subsequent migration, the movement of the off-row LOB column to in-row can be done to the new row version created after the row is cached in the IMRS 210.

If an inserted row in the IMRS 210 contains only in-row LOB columns, then a delete can be performed normally (e.g., as described herein). However for deletion of a migrated row, if it includes only in-row LOB columns, the counterpart row in the page-based storage 320 may be deleted through walking back all the off-row LOB columns and deallocating their page chains. As the row in the IMRS 210 may no longer have off-row LOB columns, whereas the original may have had several, an optimization can be provided to carry-forward the state of each LOB column which was off-row when the row was migrated to the IMRS 210. This can be used to correctly and efficiently drive the page deallocation of those LOB columns which were off-row before migration.

Another scenario can be where the in-memory row has some off-row LOB columns and off-row LOB values in the counterpart page-based storage 320 row. This can arise when a row with off-row LOB values are migrated to the IMRS 210, followed by updates that bring the off-row values in-row, followed by more updates which cause these in-row values to be migrated off-row. Deletion of such a row from the IMRS 210 can require deallocating the off-row page chains of the latest version of the row, along with deallocating the off-row page chains of the page-based storage 320 counterpart version of the row.

Another scenario can be where frequent updates to an in-memory row produce multiple intermediate, uncommitted versions with off-row LOB chains for some columns and not for others, where the LOB values may toggle from off-row to in-row across update versions. Then the row can be deleted within the same transaction. Intermediate updates to an off-row LOB column can be performed as a delete and/or insert, so the page-deallocation of off-row LOB columns in older versions can be done in-line with the statement. The memory reclamation of these intermediate versions can be performed via garbage collection 280, which can hand off the FTP handle for embedded off-row columns to another LOB page deallocation background thread.

Garbage Collection (GC) 280

Keeping older versions of rows and/or other data can be beneficial, as certain procedures may require a version of a row which is not the latest. Additionally, memory can be optimized by avoiding row forwarding, which can cause holes in memory because a new image of a row may not be exactly the same size as an old image of the row. Instead, new rows can be added for updates of existing rows, which can reduce the number of cache invalidations. Further, avoiding in-place updates can aid in rollback of a transaction without requiring the transaction log 380.

However, in some aspects, without garbage collection 280, the IMRS 210 may eventually run out of memory and/or become unusable. Support for garbage collection 280, can be provided for IMRS 210 enabled databases. Garbage collection 280 can be performed by a thread (e.g., a background thread) and/or configured to free up pieces of memory which are no longer required, such as rows, row versions, metadata for a row, pages, transactions, and/or the like. Additionally or alternatively, garbage collection 280 can free up space occupied by data in-memory which can be marked as cold, which can provide space for hot or otherwise warmer data to be stored within the IMRS 210.

In some aspects, garbage collection 280 should avoid consuming processing power trying to visit each piece of allocated memory to check whether the data stored has become obsolete, as this can bring down the overall throughput of the SA 200. If garbage collection 280 is able to free up space as soon as it becomes obsolete, then wasted space in the IMRS 210 can be reduced. With less wasted space, more hot data can be pulled into the IMRS 210 which can increase the overall throughput of the SA 200.

As described herein, IMRS 210 rows may be modified by creating a newer version for the row, while still maintaining older version(s) of the row, which can be linked through a list, such as a singly linked list which links all (existing) versions of a row. In some implementations, rows can have an immutable in-memory header structure, off of which hangs multiple in-memory versions, the memory for which may be periodically reclaimed. Additionally or alternatively, each version can have its own data row buffer to facilitate easy reclamation of version memory via garbage collection 280.

Figure 8:
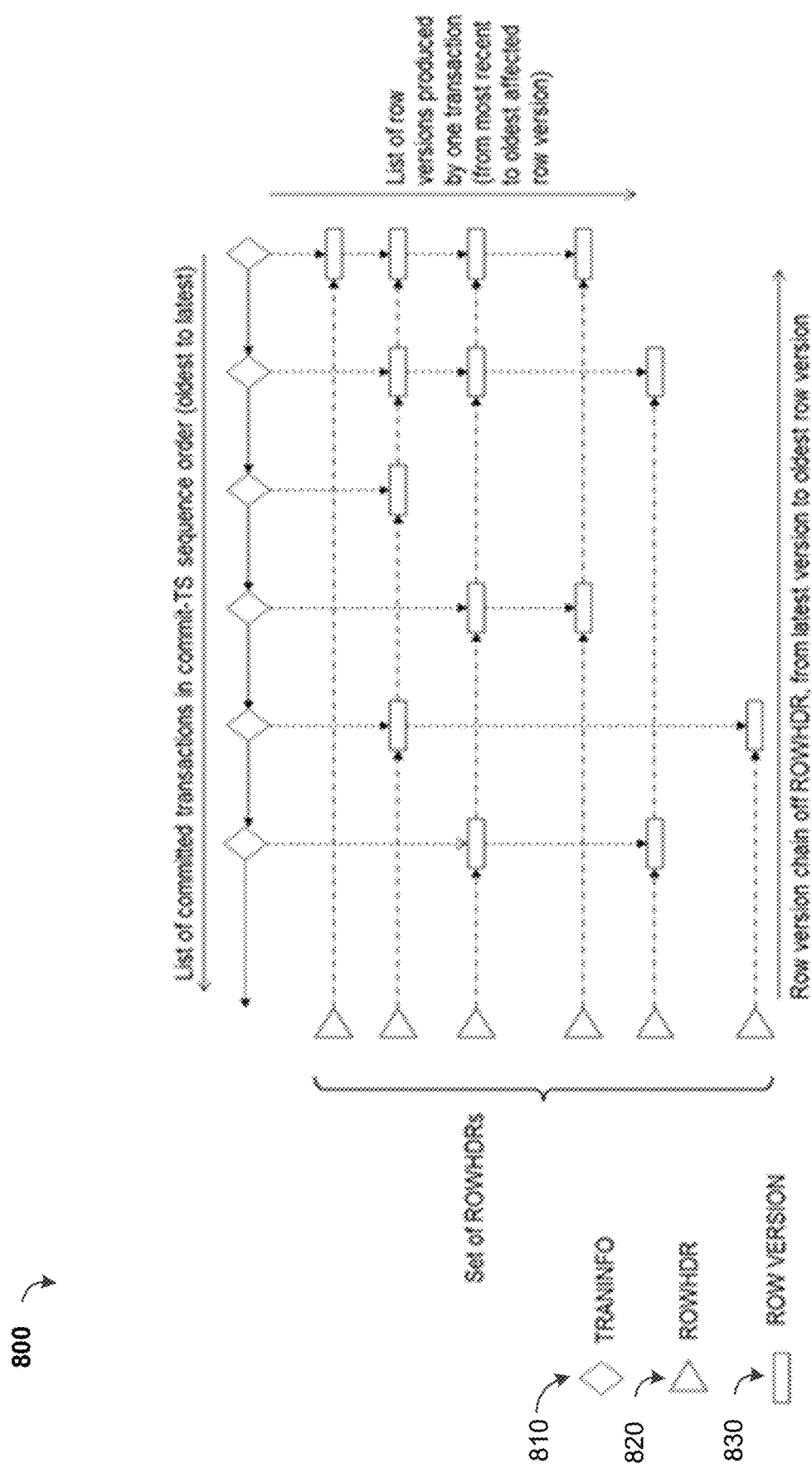
FIG. 8 illustrates a diagram of row version chaining, in accordance with some implementations.

FIG. 8 illustrates a diagram 800 of row version chaining, in accordance with some implementations. As illustrated, the vertical lines link row versions created by a particular transaction and the horizontal lines link row versions of a particular row. A pointer can be used to point to the head (illustrated as TRANINFO) of the vertical links, which can include a transaction descriptor 810. A pointer can similarly be used to point to the head (illustrated as ROWHDR) of the horizontal links, which can include a row header 820. In various implementations, each row can have its own row header.

As illustrated, transaction descriptor 810 structures can be linked to each other in the order they finish. The row versions pointed to by transaction descriptor 810 structures can be in the reverse order of their creation time. The row versions pointed to by row header 820 structures can be linked from newest to oldest (e.g., in existence). In some aspects, the transaction descriptor 810 and/or the row header 820 can include singly linked lists, which can save memory on a per version basis.

In some implementations, the SA 200 can maintain a clock (e.g., a counter) which can be incremented with each commit of a transaction in the database. The time in the clock can be denoted as a monotonically increasing integer number. Upon initialization (e.g., after a reboot), the first transaction committed to the database can cause the clock to tick and bring the time to a value of '1'. This first transaction committed can be assigned a commit timestamp based on the clock (e.g., commit$_{ts}$=1). Subsequently, each transaction committed can get a unique commit timestamp. Commit timestamps can be stored in the transaction descriptor 810 structure corresponding to the committed transaction. Additionally or alternatively, a list of transaction descriptor 810 structures can be maintained in-memory in the order of their commit timestamp.

In some aspects, garbage collection 280 can be multi-threaded and/or non-blocking, which can efficiently reclaim memory from older row versions without affecting transaction performance. Requiring procedures to lock-unlock, latch-unlatch, and/or keep-unkeep a piece of memory as part of reading memory can also affect the performance and/or scalability of the SA 200. Accordingly, instead of having operations (e.g., ISUD operations) lock-unlock each piece of memory accessed, in various implementations, statement registration and deregistration can be provided (e.g., as part of garbage collection 280). With statement registration, various operations, such as ISUD operations and/or other operations that read a piece of memory, can be registered at the start of execution. At the end of execution, the registered statement can be deregistered. As part of statement registration, a statement descriptor (stmt$_{desc}$) can be created in memory.

Figure 9:
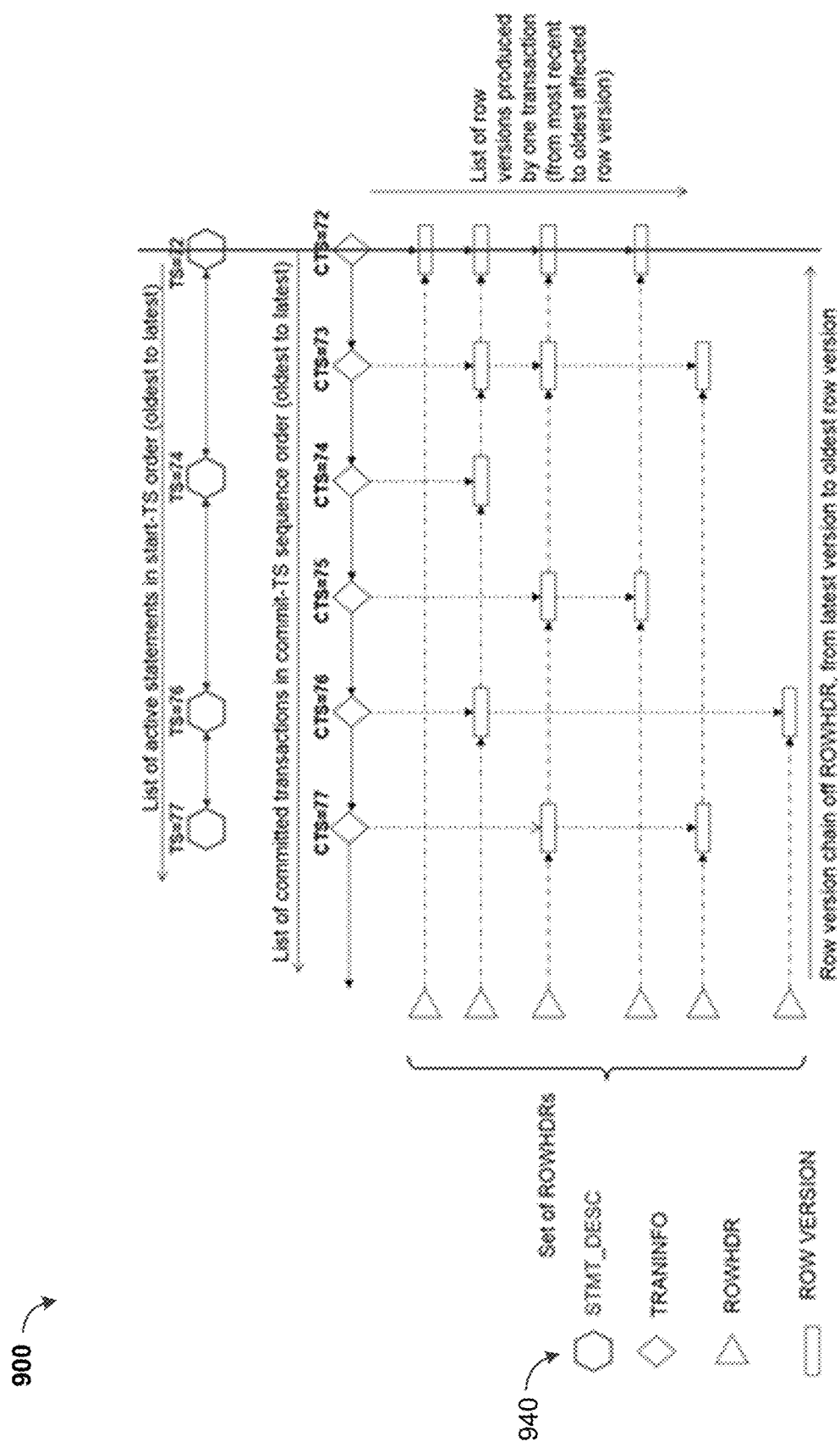
FIG. 9 illustrates a diagram of row version chaining with statement descriptors, in accordance with various implementations.

FIG. 9 illustrates a diagram 900 of row version chaining with statement descriptors, in accordance with various implementations. In some implementations, the latest commit timestamp can be registered as a start timestamp (start$_{ts}$) of the statement, within the statement descriptor. As illustrated, a list of statement descriptors can be maintained in the order of start timestamps.

Garbage collection 280 can provide one or more background threads, which can be woken up (e.g., from an idle state) when there is garbage for cleanup. At other times, the threads may be in an idle state (e.g., assigned to execute a specific set of instructions but awaiting execution). Garbage collection 280 can assign a thread to work exclusively on a row version list hanging off a transaction descriptor 810. Based on various heuristics, a thread might not free up versions in the list.

Garbage collection 280 threads can be allotted a transaction descriptor 810 while traversing the list of transaction descriptor 810 in increasing order of their commit timestamps. If the commit timestamp of a transaction descriptor 810 (TI$_n$) is greater than or equal to the oldest, registered statement descriptor's start timestamp, then the transaction descriptor 810 can be prevented from being assigned to a garbage collection 280 thread for garbage collection and/or the garbage collection 280 thread can be set to an idle mode. For example, as illustrated, transaction descriptor 810 with commit timestamps TI$_n$≥72 might not be assigned to a garbage collection 280 thread. This prevention can be provided because the oldest registered statement (and any of the newer statements) in the database can be actively reading a row version created by TI$_n$ and/or any transaction committed after TI$_n$. This procedure can prevent garbage collection 280 from freeing up memory on which a task might be active.

Figure 10:
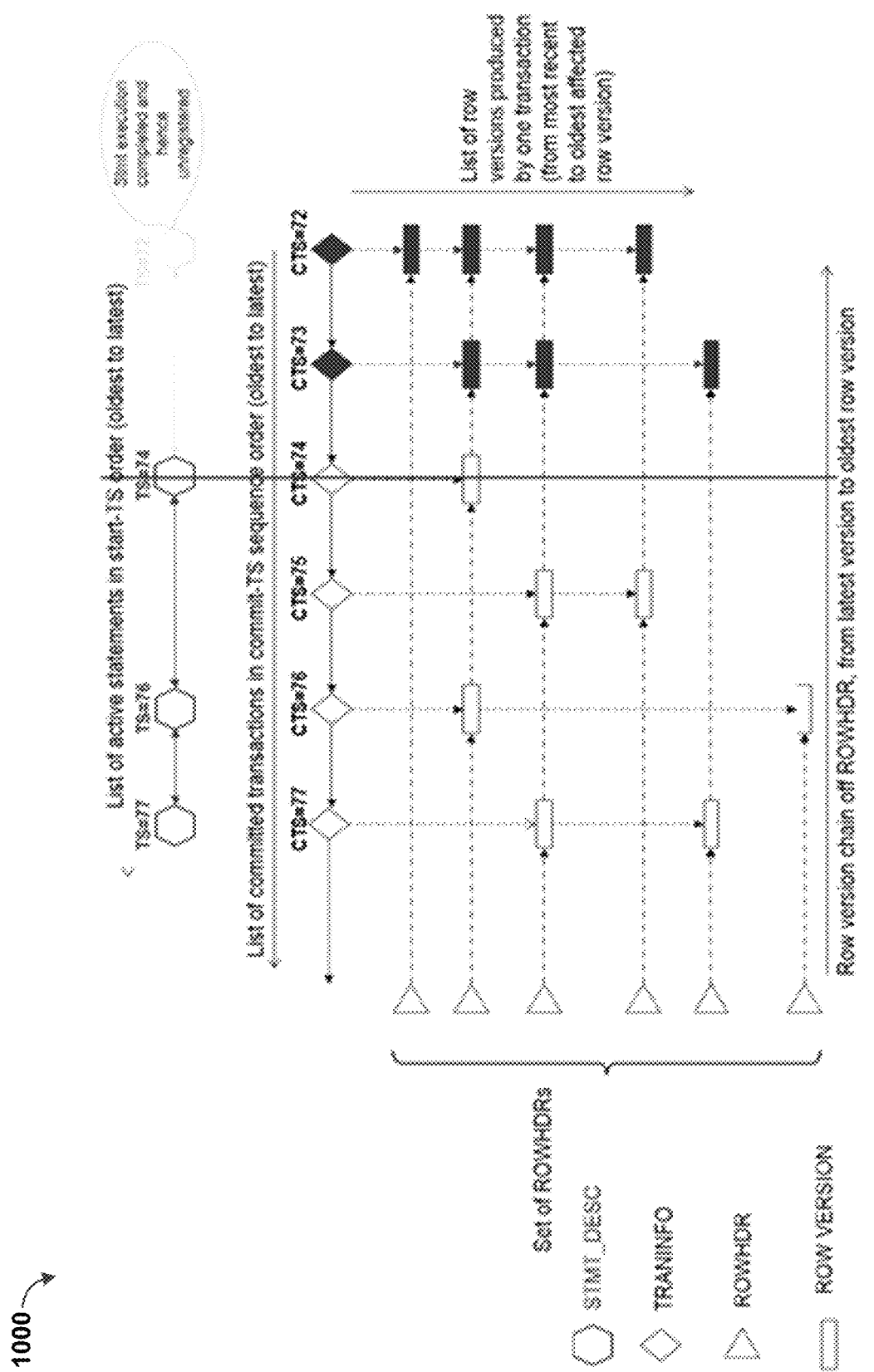
FIG. 10 illustrates another diagram of row version chaining with statement descriptors, in accordance with various implementations.

FIG. 10 illustrates another diagram 1000 of row version chaining with statement descriptors, in accordance with various implementations. In some aspects, diagram 1000 can be a representation of diagram 900 of FIG. 9, after the oldest transaction descriptor 810 (with the timestamp value of '72') is committed. When the oldest transaction descriptor 810 is committed, the corresponding statement descriptor (with the timestamp value of '72') can be deregistered. When the oldest statement descriptor is deregistered, a garbage collection 280 thread assigned to the oldest transaction descriptor 810 (with the timestamp value of '72') can be woken up. Similarly, any additional garbage collection 280 threads assigned to newer transaction descriptor 810 can be woken up, provided that the timestamp of the transaction descriptor 810 is less than the oldest registered statement descriptor 810 (e.g., with the timestamp value of '74' in the diagram 1000).

If a row version that garbage collection 280 is trying to collect is not the latest committed version of that row, then garbage collection 280 can free up the row without additional steps. This can occur because none of the registered statements may be attempting to access this older version of a row. However, in some aspects, a statement can access an older version of a row. This can happen when a statement is accessing and/or reading the latest version of a row and, in the meantime, the row gets updated by some other task. However, if the statement reading the row has registered the row with garbage collection 280, then it can be safe to read the older version.

Unlike older versions of a row, the latest version of a row may require additional processing via garbage collection 280. If the latest version of a row belongs to a row which is not marked as cold, then the row version should remain in memory. Accordingly, garbage collection 280 can leave this row version alone, continue processing other rows, and/or terminate. However, if the latest version belongs to a row marked as cold, then this row (and its versions) should be evicted from the IMRS 210. As this row version is the latest version of the row, any registered statement could be actively reading the version, so the row version might not be available for immediate freeing. Instead, the row version 830 can be "re-queued."

Re-queuing can include a two-step procedure implemented via garbage collection 280. As a first step of re-queuing, the version of the row can be removed from the IMRS 210 so that it is no longer accessible to statements (e.g., registered statements) in the system. This can involve garbage collection 280 making the piece of memory inaccessible for other tasks and/or statement (e.g., reader statements) in the system, and/or waiting until all registered statements accessing the version become deregistered. When there are no registered statements accessing the row, garbage collection 280 can free up memory allocated for the row. However, because some of the currently registered statements might already be reading the relevant piece of memory and/or may have cached a pointer to the memory, the row version might not be freed up right away.

As a second step of re-queuing, garbage collection 280 can push this version to its own version chain, which can be held off of a transaction descriptor 810 for garbage collection 280. Once garbage collection 280 is done with visiting all the versions hanging off the current transaction descriptor 810, garbage collection 280 can queue up its own transaction descriptor 810 towards the end of the transaction descriptor 810 list. In some implementations, the transaction descriptor 810 for garbage collection 280 may only be worked upon by some garbage collection 280 thread when all the currently registered statements finish their execution and/or deregister themselves. Accordingly, the piece of memory being freed can be protected, not only for the currently active task, but for upcoming tasks as well, as the memory location was made inaccessible to them.

Other than the row versions 830, other objects might be utilized, such as row headers 820, transaction descriptors 810, in-memory pages (e.g., with entries for rows on it), and/or the like. These other objects may also need to be freed up. Garbage collection 280 can use a cascaded memory freeing-up technique to free the space occupied by such objects. A general technique can be to tie up the freeing of an object at higher level to the freeing of an object at lower level. Levels of objects here can be very well defined in the IMRS 210. For example, an in-memory page can be an object at higher level which has many row headers 820 associated to it. Such row headers 820 can be a lower level object with respect to a page. Similarly, row versions 830 can be even lower level objects to row headers 820 as an object. Re-queuing methods can be extended at both the steps and/or cascaded, which can be referred to as a "Cascading Technique."

In some implementations, to make an object inaccessible at least a portion of the following operations can occur:
(A) A lower level object points to the immediate higher level object and/or a count of the number of lower level objects accessible through a higher level object is maintained in the higher level object. This count can increase with new lower level objects made accessible through it and/or decremented when a lower level object is made inaccessible through it. Once this count becomes zero, the higher level object itself can be made inaccessible from the object at the level higher to itself.
(B) Space occupied by objects is freed up. As mentioned earlier, lower level objects may point to the immediate higher level object and/or a count the number of lower level objects pointing to a higher level object can be maintained in the higher level object. This count can be different from the count mentioned above. In some aspects, this number can increase when new lower level objects starts pointing to it and/or decrease when this lower level object gets garbage collected. When this count becomes zero, the higher level object can be garbage collected.

At least a portion (e.g., all) of the row versions 830 can have a back pointer to the row header 820 and the row header 820 itself can have a counter of a number of row versions 830 pointing to it. When a row version 830 is allocated for a row, the counter can be incremented in the row header. Similarly, when a row version 830 gets freed up, the counter can be decremented. When this counter in row header 820 becomes zero, the row header 820 itself can be freed up. The same or similar strategy can be followed to free up space occupied by transaction descriptors 810. For example, a transaction descriptor 810 can maintain a count of the number of row versions 830 hanging off it and/or those row versions 830 can have a back pointer to the transaction descriptor 810.

The in-memory page which contains the entries and/or pointers to the row headers 820 can additionally or alternatively maintain a counter of the number of rows it is referencing. Similarly, row headers 820 can have back pointers to the page. If garbage collection 280 is trying to remove a cold row from the IMRS 210, garbage collection 280 can remove the entry of this row from the page. If this removed entry happens to be the last entry on the page, the entry of the page itself can be removed from other data structures which are pointing to the page, which can make the page, the row headers 820, and/or the row versions 830 inaccessible to other tasks in the database. Once the last row header 820 referencing back to a page gets freed up, the page may also be freed up. Hence this can be how freeing up a row version has cascading effects leading up to freeing up of row headers 820, transaction descriptors 810, pages, and/or data structures that point to the pages.

At times, a task in a database might want to access the older row versions 830 of a row. In order to do so, the task may traverse the version chain off the row header 820 from most recent to oldest. Until, this task is accessing the row version 830 which is the most recently committed when it registered itself, methods described herein may protect this task from accessing any freed up memory. However, the task might cause issues if it tries to access an older row version that has not been registered yet (e.g., on the left side of the vertical line associated with TS=74 illustrated in FIG. 10). For this special case, a "keep" count may be included in the row header 820. Any such special tasks could increment this keep count of the row before attempting to read the older versions off the version chain. Additionally, at the same time when garbage collection 280 is trying to free up a row version 830, if the keep count in the corresponding row header 820 is greater than zero, it may use re-queuing method described herein to free up the row version.

Figure 11:
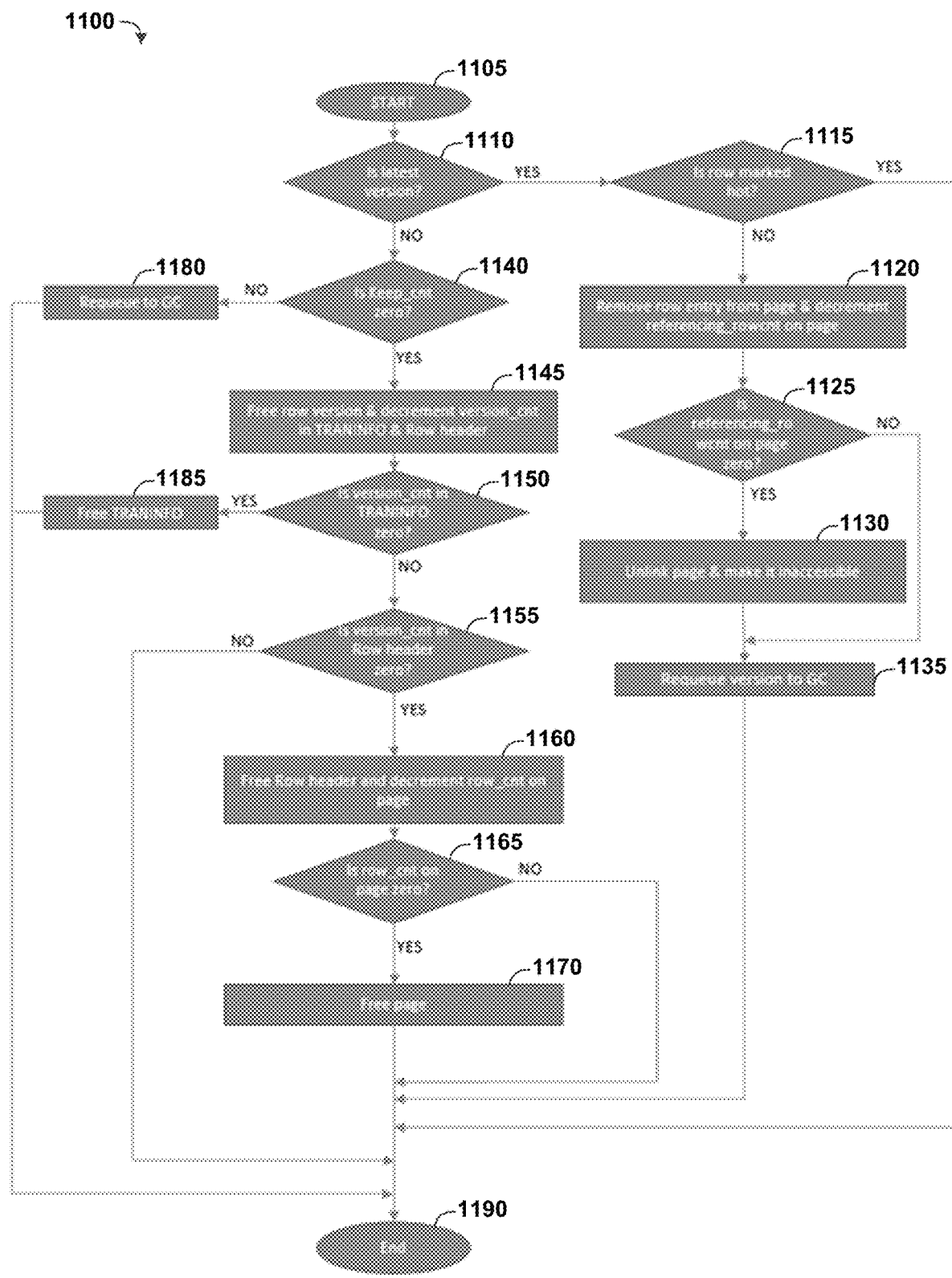
FIG. 11 illustrates a flowchart for implementing garbage collection, in accordance with various implementations.

FIG. 11 illustrates a flowchart of an example method 1100 for implementing garbage collection 280, in accordance with various implementations. In some aspects, method 1100 can be implemented at least in part by a garbage collection 280 thread. As illustrated, the method 1100 can start at operational block 1105. Method 1100 can next proceed to decision block 1110, where it can be determined whether the row version being accessed if the most recent version. If so, method 1100 can proceed to decision block 1115 where it is determined whether the row is marked as hot. If so, method 1100 can proceed to operational block 1190, where the method can end. If instead, at decision block 1115, it is determined that the row is not marked as hot, then method 1100 can proceed to operational block 1120, where the row entry can be removed from the page and/or a referencing row counter on the page can be decremented.

Thereafter, method 1100 can proceed to decision block 1125 where it can be determined whether the referencing row counter on the page is zero or null. If so, then method 1100 can proceed to operational block 1130 where the page can be uplinked and/or made in accessible. Thereafter, method 1100 can proceed to operational block 1135, where the row version can be (re)queued for garbage collection. Thereafter, method 1100 can proceed to operational block 1190. If instead, at decision block 1125, it is determined that the referencing row counter on the page is not zero or not null, then method 1100 can proceed to operational block 1135 instead of first proceeding to operational block 1130.

If instead, at decision block 1110, it is determined that the row version in question is not the latest version, then method 1100 can proceed to decision block 1140, where it can be determined whether a keep counter is zero or null. If not, then method 1100 can proceed to operational block 1180, where the row is (re)queued for garbage collection. Thereafter, method 1100 can proceed to operational block 1190. If instead, at decision block 1140, it is determined that the keep counter is zero or null, then method 1100 can proceed to operational block 1145, where the row version can be freed up and/or a version counter in the associated transaction descriptor and/or row header can be decremented.

Thereafter, method 1100 can proceed to decision block 1150, where it can be determined whether the version counter in the transaction descriptor is zero. If so, then method 1100 can proceed to operational block 1185, where the transaction descriptor can be freed. Thereafter, method 1100 can proceed to operational block 1190. If instead, at decision block 1150, it is determined that the version counter in the transaction descriptor is not zero, the method 1100 can instead proceed to decision block 1155.

At decision block 1155, it is determined whether the version counter in the row header is zero. If not, then method 1100 can proceed to operational block 1190. If so, method 1100 can instead proceed to operational block 1160, where the row header can be freed and/or a row counter on the page can be decremented.

Thereafter, method 1100 can proceed to decision block 1165, where it is determined whether the row counter on the page is zero. If not, then method 1100 can proceed to operational block 1190. If so, method 1100 can instead proceed to operational block 1170, where the page can be freed. Thereafter, method 1100 can proceed to operational block 1190.

FIGS. 12-14 illustrate pseudocode 1200-1400 for implementing garbage collection 280, in accordance with various implementations.

In some aspects, garbage collection 280 can provide for easy determination of whether an object in memory has become obsolete. Once an object becomes obsolete, the space occupied by the object can be freed up efficiently. In some implementations, garbage collection 280 can be configured to free up space in the IMRS 210 at or around the rate at which data is added to the IMRS 210. In some aspects, garbage collection 280 can insure that the memory being reclaimed is obsolete and/or may not be read by another other task, which could affect performance. In some implementations, as part of freeing space occupied by obsolete objects, the space occupied by meta-data pointing to those objects can also be freed. The processing resources required to locate and/or remove the metadata structures pointing to obsolete objects can be reduced through the use of garbage collection 280.

CPU cycles spent searching obsolete objects in memory can be reduced. Techniques described herein can help to ensure that garbage collection 280 reaches an object only when the object becomes obsolete. Minimal CPU cycles may be spent by user tasks to help garbage collection 280 in finding and freeing the obsolete objects. The minimal CPU cycles spent here can be independent of the number of objects in memory. The technique of statement registration and deregistration can be cost efficient in terms of CPU usage, as it may be a onetime process that occurs during the execution of a statement. Other techniques may require locking and unlocking of every piece of memory that a task accesses during the statement execution. The technique of statement registration and deregistration can also help garbage collection 280 in saving CPU cycles, as it may not be required to look for garbage in memory. With re-queuing methods, space occupied by active objects may be freed to make the space available for newer active objects. In some aspects, the data in such active objects can be stored on some secondary storage (e.g., more long term memory such as the page-based storage 320) if any future access to them is needed. By using cascading techniques, the freeing up of meta-data objects in the memory can be cascaded to free up of obsolete objects in memory. Hence the advantages for the objects in memory may also be applicable for meta-data in memory.

Figure 15:
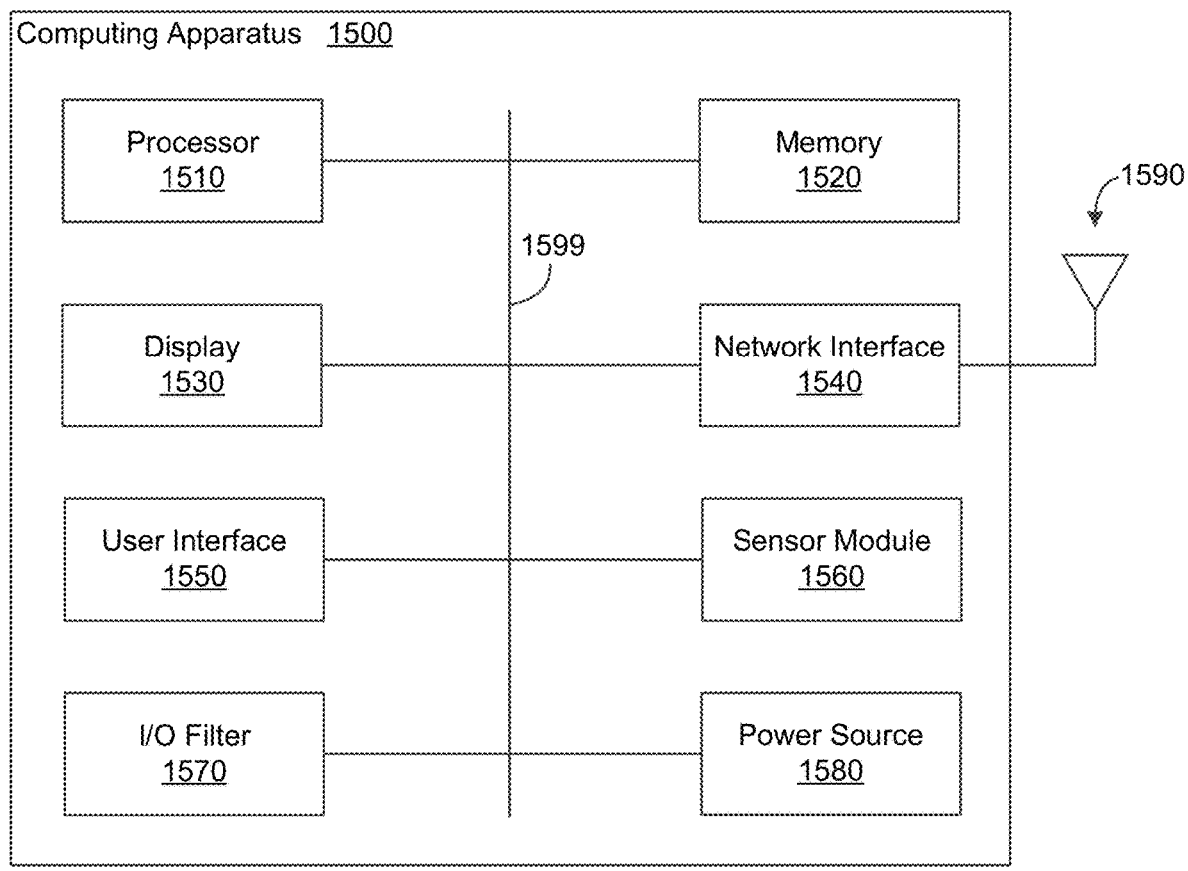
FIG. 15 illustrates an example computing apparatus, in accordance with some example implementations.

FIG. 15 illustrates an example computing apparatus 1500 which may be used to implement one or more of the described devices and/or components, in accordance with some example implementations. For example, at least a portion of the computing apparatus 1500 may be used to implement at least a portion of the computing device 110, an apparatus providing the database 120, an apparatus providing the external software 130, one or more of the user access devices 140, an access device 165, and/or the like. Computing apparatus 1500 may perform one or more of the processes described herein.

As illustrated, computing apparatus 1500 may include one or more processors such as processor 1510 to execute instructions that may implement operations consistent with those described herein. Apparatus 1500 may include memory 1520 to store executable instructions and/or information. Memory 1520 may include solid-state memory, solid-state disk drives, magnetic disk drives, or any other information storage device. In some aspects, the memory 1520 may provide storage for at least a portion of a database (e.g., the database 120 or some other organization of data). Apparatus 1500 may include a network interface 1540 to a wired network or a wireless network, such as the network 160 of FIG. 1. Wireless networks may include Wi-Fi, WiMAX, and cellular networks (2G/3G/4G/5G), and/or any other wireless network. In order to effectuate wireless communications, the network interface 1540, for example, may utilize one or more antennas, such as antenna 1590.

Apparatus 1500 may include one or more user interface, such as user interface 1550. The user interface 1550 can include hardware or software interfaces, such as a keyboard, mouse, or other interface, some of which may include a touchscreen integrated with a display 1530. The display 1530 may be used to display information to a user, provide prompts to a user, receive user input, and/or the like. In various implementations, the user interface 1550 can include one or more peripheral devices and/or the user interface 1550 may be configured to communicate with one or more peripheral devices.

In some aspects, the user interface 1550 may include one or more sensors and/or may include an interface to one or more sensors. The operation of these sensors may be controlled at least in part by a sensor module 1560. The apparatus 1500 may also comprise and input and output (I/O) filter 1570, which can filter information received from the sensors or other user interfaces 1550, received and/or transmitted by the network interface 1540, and/or the like. For example, signals detected through sensors can be passed through the I/O filter 1570 for proper signal conditioning, and the filtered data may then be passed to the sensor module 1560 and/or processor 1510 for validation and/or processing. The apparatus 1500 may be powered through the use of one or more power sources, such as power source 1580. As illustrated, one or more of the components of the apparatus 1500 may communicate and/or receive power through a system bus 1599.

Figure 16:
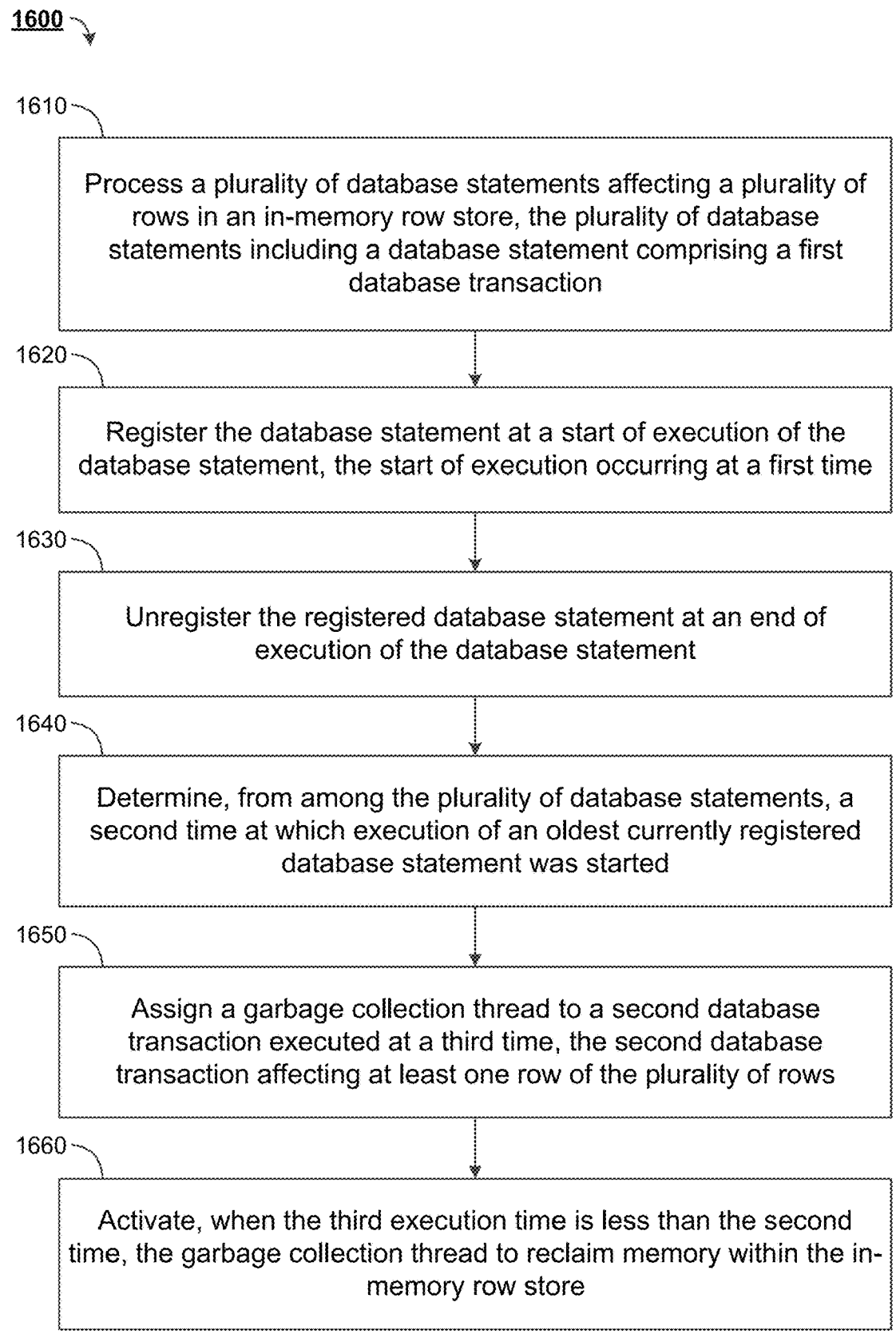
FIG. 16 illustrates an example of a method for maintaining an in-memory row storage architecture, in accordance with some example implementations.

FIG. 16 illustrates a flowchart of a method for an in-memory row storage architecture, in accordance with some example implementations. In various implementations, the method 1600 (or at least a portion thereof) may be performed by one or more of the computing system 110, an apparatus providing the database 120, an apparatus providing the external software 130, a user access device 140, one or more of the IoT devices 150, the access device 165, the computing apparatus 1500, other related apparatuses, and/or some portion thereof. In some aspects, the apparatus 1500 may be regarded as a server.

Method 1600 can start at operational block 1610 where the apparatus 1500, for example, can process a plurality of database statements affecting a plurality of rows in an in-memory row store, the plurality of database statements including a database statement comprising a first database transaction.

Method 1600 can proceed to operational block 1620 where the apparatus 1500, for example, can register the database statement at a start of execution of the database statement, the start of execution occurring at a first time.

Method 1600 can proceed to operational block 1630 where the apparatus 1500, for example, can unregister the registered database statement at an end of execution of the database statement.

Method 1600 can proceed to operational block 1640 where the apparatus 1500, for example, can determine, from among the plurality of database statements, a second time at which execution of an oldest currently registered database statement was started.

Method 1600 can proceed to operational block 1650 where the apparatus 1500, for example, can assign a garbage collection thread to a second database transaction executed at a third time, the second database transaction affecting at least one row of the plurality of rows.

Method 1600 can proceed to operational block 1660 where the apparatus 1500, for example, can activate, when the third execution time is less than the second time, the garbage collection thread to reclaim memory within the in-memory row store.

In some aspects, execution of at least a portion of the method 1600 can provide for uniform and/or transparent access of data (e.g., rows, tables, partitions, and/or the like) regardless of the location of the data (e.g., in-memory or in a persistent page store). Additionally or alternatively, execution of at least a portion of the method 1600 can provide lock-based standards-compliant (e.g., American National Standards Institute (ANSI) standards) transaction isolation levels, such as read-committed, repeatable reads, serializable isolation, and/or the like without loss of ACID semantics. In some aspects, execution of at least a portion of the method 1600 can provide full application and/or SQL statement compatibility, such as by not restricting access to database statements and/or queries based on the location of the data.

Although several aspects are described herein with respect to the IMRS 210, other implementations are possible. For example, other in-memory database systems can be enhanced through the use of at least some of the techniques described herein.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic input, speech input, tactile input, and/or the like. Other possible input devices include touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
at least one processor; and
at least one memory storing instructions which, when executed by the at least one processor, cause operations comprising:
processing a plurality of database statements affecting a plurality of rows in an in-memory row store, the plurality of database statements including a database statement comprising a first database transaction;
registering the database statement at a start of execution of the database statement, the start of execution occurring at a first time;
unregistering the registered database statement at an end of execution of the database statement;
determining, from among the plurality of database statements, a second time at which execution of an oldest currently registered database statement was started;
assigning a garbage collection thread to a second database transaction committed at a third time, the second database transaction affecting at least one row of the plurality of rows;
activating, when the third time is less than the second time, the garbage collection thread to reclaim memory within the in-memory row store;
in response to the activating, determining, by the garbage collection thread, whether a current row version is a latest committed row version of the at least one row affected by the second database transaction and whether the current row version is transactionally active based on an indicator indicative of the transactionally active state; and
in response to determining the current row version is the latest row version and the current row version is not transactionally active, reclaiming, by the garbage collection thread, the current row version from the in-memory row store by removing the at least one row from the in-memory row store.

2. The system of claim 1, wherein the operations further comprise:
determining, based on a time at which the at least one row was last accessed, whether the at least one row is transactionally active; and
marking, when the at least one row is not transactionally active, the at least one row as inactive, the marking comprising storing the indication in a row header for the at least one row, the row header stored in the in-memory row store and comprising at least one pointer to each version of the at least one row that exists in the in-memory row store.

3. The system of claim 1, wherein the operations further comprise:
storing one or more row versions for the at least one row in the in-memory row store, wherein each of the one or more row versions comprise a pointer to a row header associated with the at least one row and a pointer to data for the row version; and
storing the row header in the in-memory row store, wherein the row header comprises an indication of a number of row versions pointing to the row header and an identifier for the at least one row.

4. The system of claim 3, wherein the operations further comprise:
determining, by the garbage collection thread, whether a first row version of the at one or more row versions may be removed from the in-memory row store;
freeing, in response to determining that the first row version may be removed, memory allocated for the first row version from the in-memory row store; and
decreasing, in response to determining that the first row version may be removed, the indication of the number of row versions pointing to the row header by a value of one.

5. The system of claim 4, wherein the operations further comprise:
determining, by the garbage collection thread, whether the indication of the number of row versions pointing to the row header is zero; and
freeing, in response to determining that the indication is zero, memory allocated for the row header from the in-memory row store.

6. The system of claim 3, wherein the operations further comprise:
storing a page descriptor within the in-memory row store, wherein the page descriptor comprises an indication of a number rows accessible through the page descriptor, a pointer to a row header for each row accessible through the page descriptor, and an indication of a number of row headers pointing back to the page descriptor.

7. The system of claim 3, wherein the operations further comprise:
storing a transaction descriptor for the second database transaction within the in-memory row store, the transaction descriptor comprising an indication of the third time, an indication of a number of row versions pointing to the transaction descriptor, and one or more pointers to the row versions pointing to the transaction descriptor; and
processing, by the garbage collection thread after the activating, the row versions pointing to the transaction descriptor to reclaim memory within the in-memory row store based on removing older row versions that are not transactionally active.

8. The system of claim 7, wherein processing the row versions comprises:
modifying, by the garbage collection thread, the current row version of the one or more row versions to make the current row version inaccessible for access, wherein a first pointer to the current row version is stored within the transaction descriptor;
freeing, after all registered statements accessing the current row version become deregistered, memory occupied by the current row version; and queueing, after the freeing, the current version for later processing by the garbage collection thread based on adding a second pointer to the current row version into the transaction descriptor.

9. The system of claim 1, wherein the first time is the same as the second time, wherein the oldest registered statement comprises the first database transaction, and wherein the second database transaction is not registered.

10. The system of claim 1, wherein each of the first time, the second time, and the third time comprise a counter that is incremented for each database transaction that is committed to the in-memory row store.

11. The system of claim 1, wherein the plurality of database statements comprise at least one of an insert operation, a select operation, an update operation, and a delete operation.

12. A non-transitory computer readable medium storing instructions which, when executed by at least one processor, cause operations comprising:
processing a plurality of database statements affecting a plurality of rows in an in-memory row store, the plurality of database statements including a database statement comprising a first database transaction;
registering the database statement at a start of execution of the database statement, the start of execution occurring at a first time;
unregistering the registered database statement at an end of execution of the database statement;
determining, from among the plurality of database statements, a second time at which execution of an oldest currently registered database statement was started;
assigning a garbage collection thread to a second database transaction committed at a third time, the second database transaction affecting at least one row of the plurality of rows;
activating, when the third time is less than the second time, the garbage collection thread to reclaim memory within the in-memory row store;
in response to the activating, determining, by the garbage collection thread, whether a current row version is a latest committed row version of the at least one row affected by the second database transaction and whether the current row version is transactionally active based on an indicator indicative of the transactionally active state; and
in response to determining the current row version is the latest row version and the current row version is not transactionally active, reclaiming, by the garbage collection thread, the current row version from the in-memory row store by removing the at least one row from the in-memory row store.

13. The non-transitory computer readable medium of claim 12, wherein the operations further comprise:
determining, based on a time at which the at least one row was last accessed, whether the at least one row is transactionally active; and
marking, when the at least one row is not transactionally active, the at least one row as inactive, the marking comprising storing the indication in a row header for the at least one row, the row header stored in the in-memory row store and comprising at least one pointer to each version of the at least one row that exists in the in-memory row store.

14. The non-transitory computer readable medium of claim 12, wherein the operations further comprise:
storing one or more row versions for the at least one row in the in-memory row store, wherein each of the one or more row versions comprise a pointer to a row header associated with the at least one row and a pointer to data for the row version; and
storing the row header in the in-memory row store, wherein the row header comprises an indication of a number of row versions pointing to the row header and an identifier for the at least one row.

15. A method comprising:
processing a plurality of database statements affecting a plurality of rows in an in-memory row store, the plurality of database statements including a database statement comprising a first database transaction;
registering the database statement at a start of execution of the database statement, the start of execution occurring at a first time;
unregistering the registered database statement at an end of execution of the database statement;
determining, from among the plurality of database statements, a second time at which execution of an oldest currently registered database statement was started;
assigning a garbage collection thread to a second database transaction committed at a third time, the second database transaction affecting at least one row of the plurality of rows;
activating, when the third time is less than the second time, the garbage collection thread to reclaim memory within the in-memory row store;
in response to the activating, determining, by the garbage collection thread, whether a current row version is a latest committed row version of the at least one row affected by the second database transaction and whether the current row version is transactionally active based on an indicator indicative of the transactionally active state; and
in response to determining the current row version is the latest row version and the current row version is not transactionally active, reclaiming, by the garbage collection thread, the current row version from the in-memory row store by removing the at least one row from the in-memory row store.

16. The method of claim 15, further comprising:
determining, based on a time at which the at least one row was last accessed, whether the at least one row is transactionally active; and
marking, when the at least one row is not transactionally active, the at least one row as inactive, the marking comprising storing the indication in a row header for the at least one row, the row header stored in the in-memory row store and comprising at least one pointer to each version of the at least one row that exists in the in-memory row store.

17. The method of claim 15, further comprising:
storing one or more row versions for the at least one row in the in-memory row store, wherein each of the one or more row versions comprise a pointer to a row header associated with the at least one row and a pointer to data for the row version; and
storing the row header in the in-memory row store, wherein the row header comprises an indication of a number of row versions pointing to the row header and an identifier for the at least one row.

* * * * *